US009871988B2

(12) United States Patent
Aubineau et al.

(10) Patent No.: US 9,871,988 B2
(45) Date of Patent: *Jan. 16, 2018

(54) INTERCONNECTING SYSTEM, VIDEO SIGNAL TRANSMITTER AND VIDEO SIGNAL RECEIVER FOR TRANSMITTING AN N-SYMBOL DATA SIGNAL

(71) Applicant: FREESCALE SEMICONDUCTOR, INC., Austin, TX (US)

(72) Inventors: Vincent Aubineau, Areches (FR); Didier Christian Geffrotin, Clichy (FR); Michael Andreas Staudenmaier, Munich (DE); Steve Bruce McAslan, Glasgow (GB)

(73) Assignee: NXP USA, Inc., Austin, TX (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/980,073

(22) Filed: Dec. 28, 2015

(65) Prior Publication Data

US 2017/0026605 A1    Jan. 26, 2017

(30) Foreign Application Priority Data

Jul. 24, 2015   (WO) .................. PCT/IB2015/001537

(51) Int. Cl.
  *G06F 11/00*   (2006.01)
  *H04N 5/38*   (2006.01)
  (Continued)

(52) U.S. Cl.
  CPC .......... *H04N 5/38* (2013.01); *H04N 21/2347* (2013.01); *H04N 5/44* (2013.01)

(58) Field of Classification Search
  None
  See application file for complete search history.

(56) References Cited

U.S. PATENT DOCUMENTS 4,794,604 A * 12/1988 Gorshe .................. H03M 5/18
                                                              714/812
5,555,305 A *  9/1996 Robinson ............. H04N 7/1696
                                                              348/E7.059

(Continued)

FOREIGN PATENT DOCUMENTS

CN    1749813 A    3/2006
CN    1766698 A    5/2006

OTHER PUBLICATIONS

"HP and Compaq Flat Panel Monitors—Flat Panel Monitor Displays Message about No Signal, Signal out of Range, Sleep, or Power Save", HP Customer Support, printed from <<http://h10025.www1.hp.com/ewfrf/wc/document?cc=us&lc=en&docname=c00061509>> on Aug. 6, 2015, 8 pages.

(Continued)

*Primary Examiner* — M. Mujtaba Chaudry

(57) ABSTRACT

The present application relates to an interconnect system for transmitting a stream of N-symbol data signals, which comprises a parallel data signal line bus, a line scrambler, a line de-scrambler and a defect detector. The defect detector is configured to detect one or more defective data signal lines. The line scrambler 110 is configured to accept an N-symbol data signal d having a sequence of data symbols in a predefined order and to output a permuted sequence d' of data symbols at its N output terminals $o_j$. The line de-scrambler is configured to accept the permuted sequence d' of data symbols at its input terminal $i'_j$, to restore the predefined order of the data symbols from the permuted sequence d' of data symbols; and to output the restored N-symbol data signal d comprising a sequence of data symbols in the predefined order.

20 Claims, 7 Drawing Sheets

(51) Int. Cl.
*H04N 21/2347* (2011.01)
*H04N 5/44* (2011.01)

(56) References Cited

U.S. PATENT DOCUMENTS

| | | | | |
|---|---|---|---|---|
| 6,111,807 | A | * | 8/2000 | Ooishi ............... G11C 7/22 365/189.05 |
| 6,851,086 | B2 | * | 2/2005 | Szymanski ........... H03M 13/09 714/781 |
| 7,405,723 | B2 | | 7/2008 | Kang et al. |
| 8,279,216 | B2 | | 10/2012 | Hong et al. |
| 2003/0123389 | A1 | * | 7/2003 | Russell ................ G06F 11/273 370/230 |
| 2003/0172336 | A1 | * | 9/2003 | Sweeney ................ H04J 14/02 714/758 |

OTHER PUBLICATIONS

U.S. Appl. No. 14/979,979, Inventor Vincent Aubineau, "Interconnecting System, Video Signal Transmitter and Video Signal Receiver for Transmitting an N-Symbol Data Signal", filed Dec. 28, 2015, Office Action—Non-Final Rejection, dated Apr. 27, 2017.

* cited by examiner

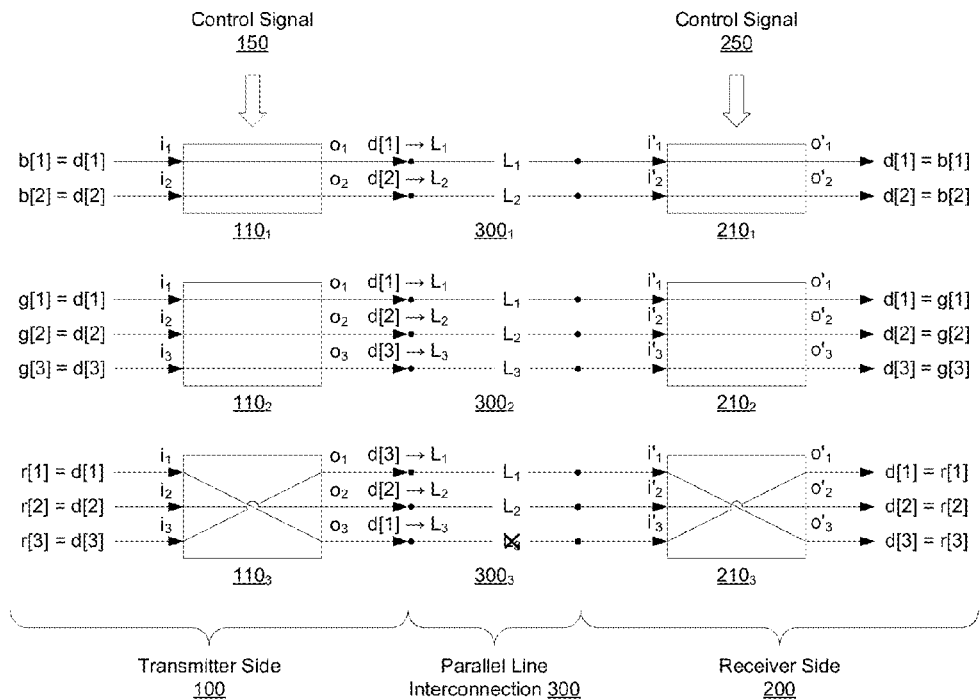
(a)
Fig. 8
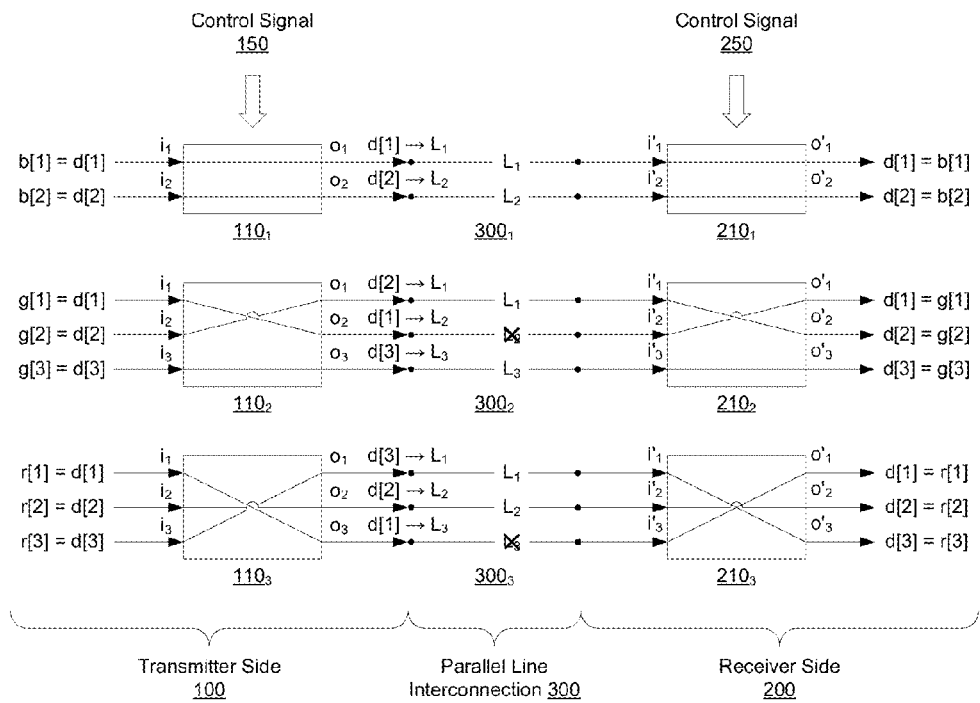
(b)

INTERCONNECTING SYSTEM, VIDEO SIGNAL TRANSMITTER AND VIDEO SIGNAL RECEIVER FOR TRANSMITTING AN N-SYMBOL DATA SIGNAL

CROSS REFERENCE TO RELATED APPLICATION(S)

The present application claims priority to International Patent Application No. PCT/IB2015/001537, entitled "INTERCONNECTING SYSTEM, VIDEO SIGNAL TRANSMITTER AND VIDEO SIGNAL RECEIVER FOR TRANSMITTING AN N-SYMBOL DATA SIGNAL," filed on Jul. 24, 2015, the entirety of which is herein incorporated by reference.

FIELD OF THE INVENTION

This invention relates to an interconnect system for transmitting a stream of N-bit data signals over an error prone wired connection, a transmitter and a receiver thereof. In particular, the present application relates to an interconnect system for transmitting an image data stream over an error prone wired connection, a transmitter and a receiver thereof.

BACKGROUND

Today's vehicle information displays such as dashboards, display composed graphical information provided by various sources such as vehicle information system, advanced driver assistance systems, navigation systems and consumer entertainment systems. Such composed graphical information includes textual, iconic, pictorial and/or figurative information and comprises both safety relevant graphical information and non-safety relevant graphical information.

Safety relevant graphical information comprises for instance vehicle speed and/or indications relating to state and warning information of the vehicle engine and vehicle components and/or state and warning information of one or more advanced driver assistance systems such as blind spot warnings and distance warnings just to mention a non-limiting selection thereof for the sake of explanation. Non-safety relevant graphical information comprises for instance information generated by entertainment and navigation systems.

Functional safety is a primary issue when displaying safety relevant information to a user controlling an apparatus, to which the safety relevant information relates and the control of which requires an adequate reaction of the user in response to the safety relevant information.

Safety relevant or safety related information represents information, an erroneous content of which might be directly responsible for death, injury or occupational illness, or the erroneous content of which may be the basis for decisions relied on, which might cause death, injury, other significant harms or other significant actions. Safety relevant or safety related information may be the output of safety critical application typically operated in a safety critical environment, which is one in which a computer software activity (process, functions, etc.) whose errors, such as inadvertent or unauthorized occurrences, failure to occur when required, erroneous values, or undetected hardware failures can result in a potential hazard, or loss of predictability of system outcome.

Image data, on the basis of which the composed graphical information is generated, is transmitted over high-speed connections between the separate components of an image processing system comprising various sources providing image data, one or more image processing units for composing the image data received from the sources, and one or more displaying components showing images composed of the image data from the sources. Parallel interfaces represent an economic solution to transfer image data between the separate components.

SUMMARY

The present invention provides an interconnect system for transmitting a stream of N-bit data signals over an error prone wired connection, a video signal transmitter and a video signal receiver as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 8 schematically illustrates signal routing diagrams of further exemplary line scrambling and de-scrambling schemes according to examples of the present invention;

DETAILED DESCRIPTION

Figure 1:
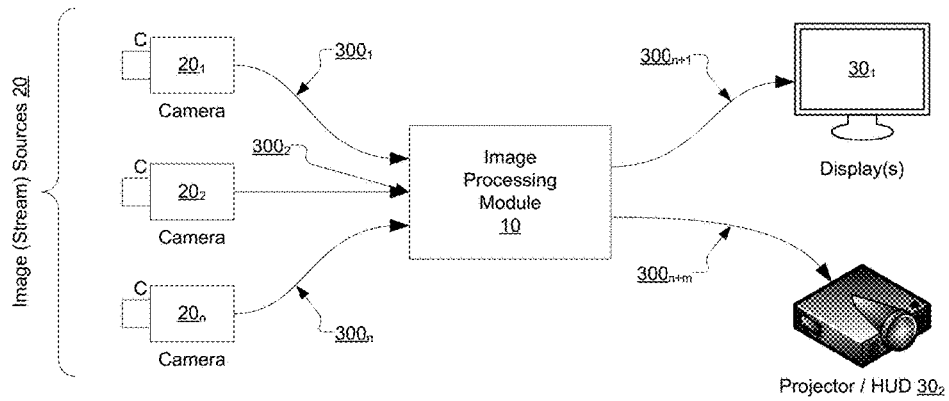
FIG. 1 schematically illustrates a block diagram of an exemplary automotive image processing system an according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In the automotive field, the presentation of composed visual information provided by several image/video data sources in an integrated graphical user interface such as a car dashboard display replacing the traditional instrument panel or a head-up display is developing rapidly.

The presentation of composed graphical information to a user of a vehicle is used to present non-safety relevant information as well as safety relevant information in a composed image to the user. In case of displaying safety relevant information to a user of a safety critical apparatus such as a vehicle it has to be ensured that the displayed safety relevant information is faultlessly and completely visually perceptible by the user or that the user of the safety critical apparatus is immediately aware about the unreliability of the information displayed to him, e.g. because the displayed information comprises structural, graphical and/or color artifacts visually perceivable by the user.

A source of unreliability is the transmission path of image data between any image data transmitter providing image data as an image data source and image data receiver accepting image data as an image data sink. As exemplified in FIG. 1, image data or image stream data is provided by various sources $20_1$ to $20_n$ through transmission paths $300_1$ to $300_n$ to an image data processing module 10, which e.g. composes the received image data and outputs the resulting composed image data to displaying components 30 such as one or more displays $30_1$ and/or one or more projectors $30_2$ including e.g. one or more head-up displays through transmission paths $300_{n+1}$ to $300_{n+m}$.

Each transmission path 300 is a potential source of error. According to an example of the present application, the image data is transmitted pixel-wise over a transmission path 300 with several parallel data signal lines for carrying image data signals. In particular, the transmission path comprises a number of control signal lines and a number of color signal lines for each color component of a pixel. For instance, a pixel may comprise 8 bits with 3 bits for each of the red and green components and the two remaining bits to the blue component; a pixel may comprise 16 bits with 4 bits for each of the red, green and blue components plus optionally 4 bits for alpha (transparency) or with 5 bits for each of the red, green and blue components plus optionally for 1 bit for alpha; a pixel may comprise 18 bits with 6 bits for each of the red, green and blue components; or a pixel may comprise 24 bits with 8 bits for each of the red, green and blue components. Further color coding of pixels are used. Those skilled in the art will understand from the following description that the present application is not limited to any specific pixel color coding. In particular, those skilled in the art will understand that the present application is applicable for image data transmission over parallel interface, where the color coding of the pixels of the image data is based on a color coding scheme such as red, green and blue (RGB) color space coding; YCbCr (luma or luminance, blue-difference chroma, red-difference chroma) color space coding; cyan, magenta, yellow (CMY) color space coding, cyan, magenta, yellow, black (CMYK) color space coding, hue, saturation, and lightness (HLS) color space coding, hue, saturation, and value (HSV) color space coding; or hue, saturation, and value (HSV) color space coding to mention a non-limiting exemplary selection of color coding schemes.

When using parallel color data signal lines each for carrying for instance a single bit, bi-level signal of the color information of one pixel, a potential source of error is a defective color signal line, which signal level remains at either low or high irrespective of the actual bit data signal level to be transmitted.

Figure 10:
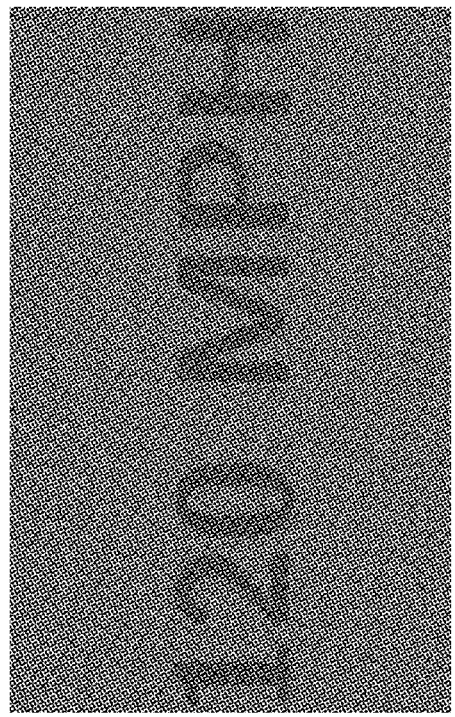
FIG. 10 illustrates exemplary display images according to examples of the present invention.
Figure 10:
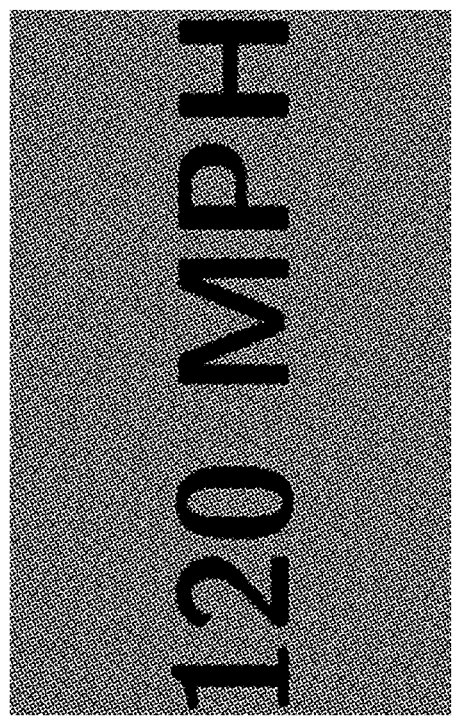

Referring now to FIG. 10, an image comprising a graphical text information "120 MPH" being substantially black-colored is composed on a substantially uniform, single-colored background, e.g. a substantially red-colored background as schematically shown in the black-and-white depiction (a) of FIG. 10. In case one of the color data signal lines is always e.g. at high level the contrast between the substantially uniform, single-colored background and the black-colored graphical text information is significantly reduced when the defective color signal line is connected for carrying with the most significant bit of the red component or a bit of high bit significance thereof as schematically shown in the black-and-white depiction (b) of FIG. 10. The graphical text information intended to be displayed black-colored is displayed in a red tone color due to the defective color data signal line such that the red tone-colored text information on the substantially uniform red-colored background may become substantially indiscernible to the user, at the worst.

A signal terminal assignment of an exemplary data signal interface for transmitting/receiving pixel-wise a stream of image data (video data) is shown in the following table relating to an exemplary state of the art digital 18-bit RGB parallel video interface e.g. to couple an video source to a TFT monitor:

| Designation | Description | Function |
| --- | --- | --- |
| DCLK, CK, Pixel Clock | Data Sampling Clock | Control line Data Sampling Clock Signal (Pixel Clock) |
| HSync, H-Sync | Horizontal Sync signal | Control line Horizontal Sync Signal (e.g. negative going) |
| VSync, V-Sync | Vertical Sync Signal | Control line Vertical Sync Signal (e.g. negative going) |
| R0 (LSB)[2] | Red Data Signal | Data Signal Lines |
| R1 | Red Data Signal | RED color channel |
| R2 | Red Data Signal | with 6 bit width |
| R3 | Red Data Signal | |
| R4 | Red Data Signal | |
| R5 (MSB)[3] | Red Data Signal | |
| GND[1] | Ground | Ground line |
| G0 (LSB)[2] | Green Data Signal | Data Signal Lines |
| G1 | Green Data Signal | GREEN color channel |
| G2 | Green Data Signal | with 6 bit width |
| G3 | Green Data Signal | |
| G4 | Green Data Signal | |
| G5 (MSB)[3] | Green Data Signal | |
| GND[1] | Ground | Ground line |
| B0 (LSB)[2] | Blue Data Signal | Data Signal Lines |
| B1 | Blue Data Signal | BLUE color channel |
| B2 | Blue Data Signal | with 6 bit width |
| B3 | Blue Data Signal | |
| B4 | Blue Data Signal | |
| B5 (MSB)[3] | Blue Data Signal | |
| GND[1] | Ground | Ground line |

-continued

| Designation | Description | Function |
| --- | --- | --- |
| ENAB | Enable | Control line Horizontal Display Position Set Signal Enables LCD |
| R/L (Optional) | Right or Left Scan | Chip Specific |
| U/D (Optional) | Up or Down Scan | Chip Specific |
| V/Q (Optional) | VGA or QVGA | Chip Specific |

Figure 2:
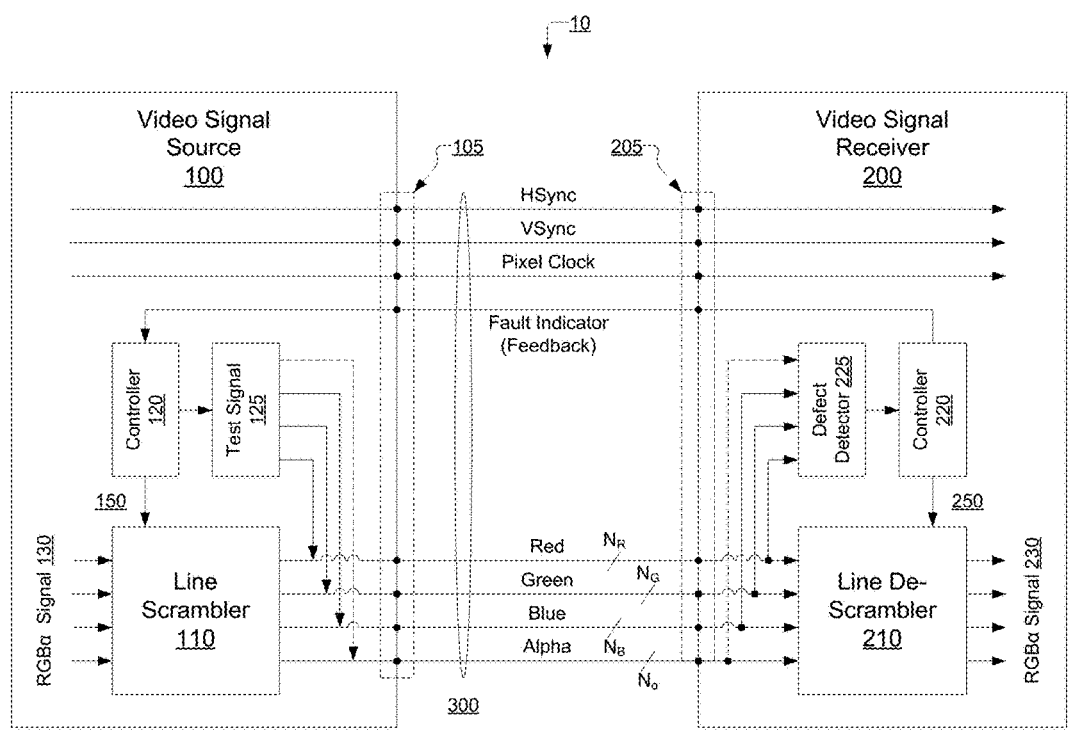
FIG. 2 schematically illustrates a block diagram of an image signal transmission system comprising an image data transmitter and an image data receiver according to an example of the present invention.

(1)E.g. ground lines are placed between various signal lines for isolation. (Only 3 ground lines are shown for the sake of illustration)
(2)LSB: Least significant bit
(3)MSB: Most significant bit Referring now to FIG. 2, a block diagram of a video signal transmitter and a video signal receiver coupled with each other through parallel interfaces and an interconnecting parallel bus according to an example of the present application is schematically illustrated. The video signal transmitter 100 and a video signal receiver 200 form an interconnect system 10 for transmitting a stream of N-symbol data signals, e.g. a steam of pixel-based image data, over an interconnecting parallel bus 300 representing a detachable error prone wired connection between the transmitter-receiver arrangement.

The video signal transmitter 100 should be understood as any source, which supplies a stream of image data signal through a parallel interface 105. Such a parallel interface 105 comprises typically one or more control terminals to output one or more control signals and several video/image data terminals to output image data signals in form of digital color signals each having a predefined number of bits or bit width coding one of the color components.

The control signals comprises exemplarily a V-SYNC (Vertical-Sync) or FP signal (Frame Pulse), e.g. used to reset the row pointer to top of a display, H-SYNC (Horizontal-Sync) or LP signal (Line Pulse), e.g. used to reset the column pointer to an edge of a display and/or a pixel clock, e.g. a trigger signal synchronized with the video data signals.

The image data signals outputted by the video signal transmitter 100 comprises a plurality of pixel data. A predefined number of pixels forms a displayable image. Each pixel data is further composed of one or more component data signals such as color data signals for each of e.g. three color components (such as a red data signal, a green data signal and a blue data signal) and a transparency (alpha) data signal. In an exemplary embodiment, the red data signal comprises a number of $N_R$ bits, the green data signal comprises a number of $N_G$ bits, the blue data signal comprises a number of $N_B$ bits and the alpha data signal comprises a number of $N_\alpha$ bits.

The video signal receiver 200 should be understood as any sink/destination, which accepts a stream of image data signals through a parallel interface 205 comprising one or more control terminals and several video/image data terminals to receive the one or more control signals and the image data signals transmitted by the video signal transmitter 100. The video signal transmitter 100 and the video signal receiver 200 are interconnected by a parallel bus 300 comprises at least one line for interconnecting one terminal of the parallel interface 105 of the video signal transmitter 100 with one corresponding terminal of the parallel interface 205 of the video signal receiver 200. In particular, the parallel bus 300 is detachable connected to the parallel interface 105 and the parallel interface 205.

For the sake of understanding, the term "bus" will be used to refer to a plurality of lines and/or conductors, which may be used to transfer one or more various types of information such as a plurality of bi-level signals. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa.

On transmitter side, a line scrambler 110 is interposed in signal flow downstream the parallel interface 105 of the video signal transmitter 100. In particular, the line scrambler 110 is directly coupled downstream to the parallel interface 105 of the video signal transmitter 100. On receiver side, a line de-scrambler 210 is interposed in signal flow upstream the parallel interface 205 of the video signal receiver 200. In particular, the line de-scrambler 210 is directly coupled upstream to the parallel interface 205 of the video signal receiver 200. Further, a controller 120 is further arranged with the line scrambler 110 of the video signal transmitter 100 and a controller 220 is arranged with the line de-scrambler 210 of the video signal receiver 200.

As set forth above with reference to the exemplary state of the art digital 18-bit RGB parallel video interface, the color components of each pixel of image data is asserted in synchronicity with the Data Sampling Clock Signal (Pixel Clock) in a fixed predefined assignment to the terminals of the interface. In the above example, the RGB color components comprises a 6-bit red component, a 6-bit green component and a 6-bit blue component. The least significant bit (LSB) of each 6-bit color component is asserted to a corresponding fixedly predefined first terminal and the further The bits of each 6-bit color component are asserted with increasing bit significance to corresponding fixedly predefined terminals of the interface stating with the least significant bits (LSB) up to the most significant bits (MSB). The bit data signal of a given bit significance of a 6-bit color component is always asserted to the same fixedly predefined terminal and hence also transmitted on the same line of the parallel bus 300 intercoupling the terminals of the parallel interfaces 105, 205 of a video signal transmitter 100 and a video signal receiver 200, respectively. It should be noted that, the components comprise e.g. three color components with $N_R$, $N_G$ and $N_B$ bits and an alpha component with $N_\alpha$ bits.

The line scrambler 110 is provided to controllably change the assigning or mapping of the individual bit data signals of an N-bit data signal to N data terminals of the transmitter side parallel interface 105. In an example of the present application, the line scrambler 110 comprises N input terminals $i_1$ to $i_N$, each of which provided for accepting a signal comprising a data bit, and N output terminals $o_1$ to $o_N$, each of which provided for outputting a signal comprising a data bit. The line scrambler 110 is selectively controllable to route each signal at one of the N input terminals $i_1$ to $i_N$ to a different one of the output terminal terminals $o_1$ to $o_N$. In particular, the line scrambler 110 is controllably configurable to establish separate connections between each of the input terminals $i_1$ to $i_N$ and each of the output terminal terminals $o_1$ to $o_N$ without conflict between the signals transmitted at the separately established connections. Accordingly, the line scrambler 110 selectively routes an N-bit input signal to the N output terminals $o_1$ to $o_N$.

The line de-scrambler 210 is provided to controllably restore the received N-bit data signal at N data terminals of the receiver side parallel interface 205 to obtain the original N-bit data signal ordered according to the original bit order. In an example of the present application, the de-scrambler 210 comprises N input terminals $i'_1$ to $i'_N$, each of which provided for accepting a signal comprising a data bit, and N output terminals $o'_1$ to $o'_N$, each of which provided for outputting a signal comprising a data bit. The line de-scrambler 210 is selectively controllable to route each signal at one of the N input terminals $i'_1$ to $i'_N$ to a different one of the output terminal terminals $o'_1$ to $o'_N$. In particular, the line de-scrambler 210 is controllably configurable to establish separate connections between each of the input terminals $i'_1$ to $i'_N$ and each of the output terminal terminals $o'_1$ to $o'_N$ without conflict between the signals transmitted at the separately established connections. Accordingly, the line scrambler 110 selectively routes an N-bit input signal to the N output terminals $o'_1$ to $o'_N$.

Each of the N output terminals $o_1$ to $o_N$ of the line scrambler 110 is fixedly connected to one of the data signal terminals of the parallel interface 105. The respective data signal terminals of the parallel interface 105 are referred to as data signal terminals $o_1$ to $o_N$ for the sake of description. Each of the N input terminals $i'_1$ to $i'_N$ of the line de-scrambler 210 is fixedly connected to one of the data signal terminals of the parallel interface 205. The respective data signal terminals of the parallel interface 205 are referred to as data signal terminals $i'_1$ to $i'_N$ for the sake of description.

The bus 300 comprises at least N data signal lines $L_j$ (where j=1, . . . , N), each of which is detachably coupled to one output terminals $o_j$ of the parallel interface 105 and to one input terminals $i'_j$ of the parallel interface 205. In particular, the N data signal lines $L_j$ are provided to each carry one data signal of an N-bit data signal of pixel data comprising for instance $N_R$-bit data signal of the red component, a $N_G$-bit data signal of the green component, a $N_B$-data signal of the blue component, and eventually a $N_\alpha$-data signal of the transparency component, wherein $N=N_R+N_G+N_B$ ($+N_\alpha$, optionally).

Figure 3:
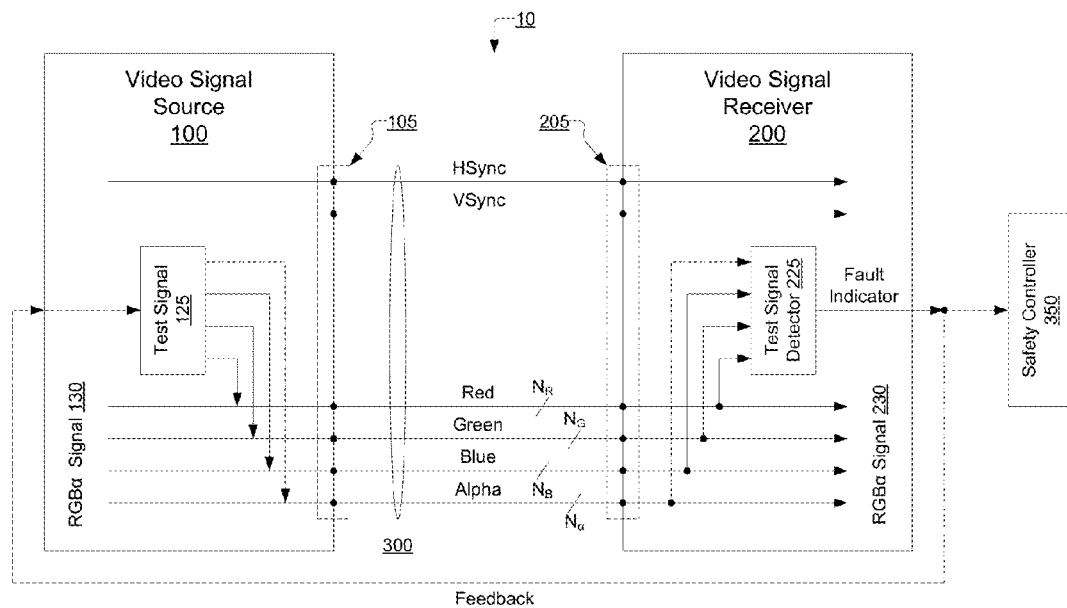
FIG. 3 schematically illustrates a block diagram of an image signal transmission system comprising an image data transmitter and an image data receiver according to another example of the present invention.

Referring now to FIG. 3, a block diagram of a video signal transmitter and a video signal receiver coupled with each other through parallel interfaces and an interconnecting parallel bus according to another example of the present application is schematically illustrated. The video signal transmitter 100 and a video signal receiver 200 form an interconnect system 10 for transmitting a stream of N-symbol data signals, e.g. a steam of pixel-based image data, over an interconnecting parallel bus 300 representing a detachable error prone wired connection between the transmitter-receiver arrangement.

A defect detector 225 is arranged on the receiver side of the video signal receiver 200. The defect detector 225 is coupled to the data signal lines, to detect a defective data signal line.

A defective data signal line is for instance a data signal line, which supplies a signal with constant level on the receiver side, for instance the data signal line is stuck at a high signal level or a low signal level irrespective of a current signal level asserted on transmitter side thereat. Further, the defective may not erroneously transmit one or more data signals asserted on transmitter side to the receiver side because of a short circuit, cross talking and/or line break. Further causes may result in a defective data signal line, which unreliably or erroneously transmits a data signal asserted thereat.

In an example of the present application, the defect detector 225 is coupled to each input terminals $i'_1$ to $i'_N$ of the parallel interface 205 to detect data signals received at the input terminals $i'_1$ to $i'_N$ of the parallel interface 205. The test signal detector 225 is configured to detect one or more predefined signals. On the basis of the predefined signals detected at the input terminals $i'_1$ to $i'_N$, the defect detector 225 detects defective data signal lines $L_j$. In an example of the present application, the one or more predefined signals are one or more test signals asserted by a test signal generator 125 on transmitter side.

The test signal generator 125, which is coupled to each output terminals $o_1$ to $o_N$ of the parallel interface 105, asserts one or more test signals at the output terminals $o_1$ to $o_N$, which are transmitted over the individual data signal lines $L_j$ of the bus 300 to the input terminal $i'_1$ to $i'_N$ of the parallel interface 205 on receiver side.

The one or more test signals are predetermined test signals and the test signal detector 225 is configured to determine whether the signals detected at the input terminals $i'_1$ to $i'_N$ of the parallel interface 205 correspond to the predetermined test signals. In case the detected signals correspond to the predetermined test signals, the data signal lines $L_j$ of the interconnecting bus 300 are intact (not defective). Otherwise, the test signal detector 225 is configured to determine at which of the input terminals $i'_1$ to $i'_N$ of the parallel interface 205 the detected data signal differs from (does not correspond to) the expected test signal, which allows to determine the one or more defective data signal lines of the bus 300.

In order to detect one or more defective data signal lines $L_j$, the one or more test signals may be asserted separately at each data signal lines carrying e.g. a $N_R$-bit data signal of the red component, a $N_G$-bit data signal of the green component, a $N_B$-data signal of the blue component, and eventually a $N_\alpha$-data signal of the transparency component of a pixel data signal.

The test signal detector 225 and test signal generator 125 are configured to cooperate in order to allow for detecting one or more defective data signal lines of the bus 300.

Figure 4:
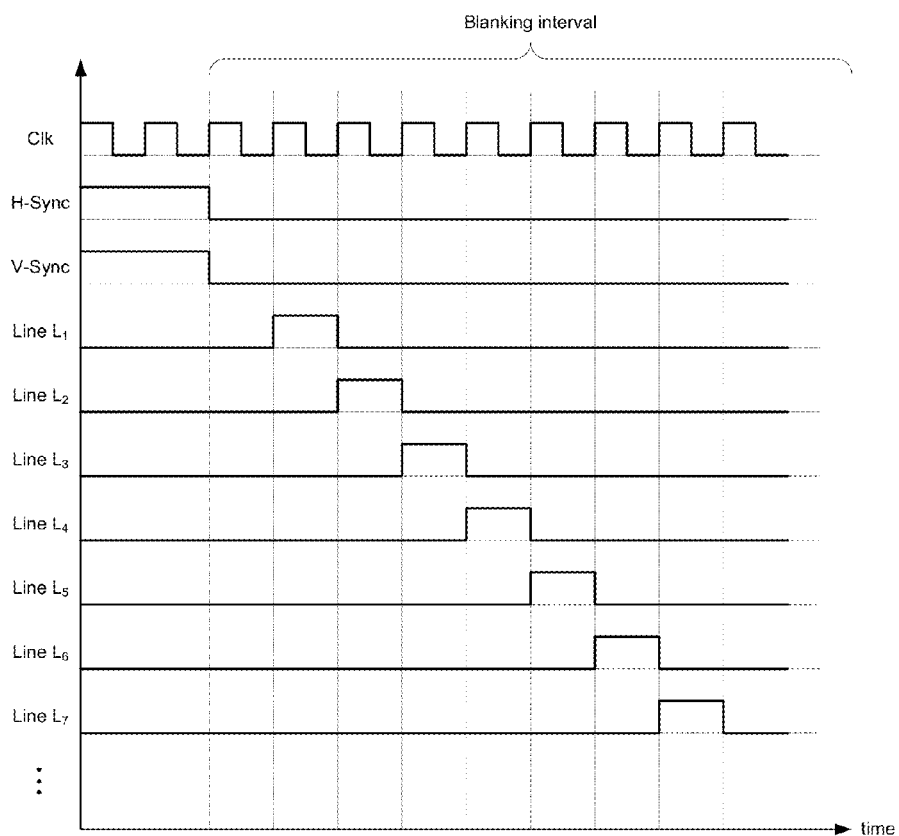
FIG. 4 schematically illustrates a signal diagram of a test pattern with individual test signals for detecting defective data signal lines according to an example of the present application.

In an example of the present application, the one or more test signals form a test signal pattern, which comprises individual test signals for each of the data signal lines $L_j$ of the bus 300. An exemplary test pattern is schematically illustrated in FIG. 4 showing a signal diagram. Each individual test signal comprises a bi-level square pulse. The pulses are shifted in time with respect to each other and in particular the pulses do not overlap in time, more particularly the pluses are consecutive in time. Furthermore, the pulses may be synchronized with a data sampling clock such as the pixel clock.

The test pattern may be asserted by the test signal generator 125 at one or more predefined moments in time occasionally or regularly. The assertion of the one or more test signals may be triggered by a control signal such as a dedicated trigger signal, a reset signal, to trigger the assertion of the one or more test signals after setting the interconnection system 10 into operation at start-up and/or restart in response to a reset), and the V-Sync signal. The control signal may be transmitted from the test signal generator 125 to the test signal detector 225 on a control signal line of the bus 300.

In particular, the assertion of the test pattern by the test signal generator 125 is triggered by the V-Sync signal and the individual test signals of the test pattern are asserted during the blanking interval indicated by the V-Sync signal. The test pattern may be asserted by the test signal generator 125 in response to every V-Sync signal.

In response to the detection of one or more defective data signal lines $L_j$ by the test signal detector 225, the test signal detector 225 is configured to issue at least one fault indication signal. The at least one fault indication signal may be processed by the receiver 200, which for instance switches a warning signal visible to the user. The receiver 200 for instance generates a warning message image inserted into the image data for being displayed to the user. Further, the fault indication signal is for instance signalized to the transmitter 100 and/or to another external unit such as a safety controller 350, which is arranged to trigger and/or control safety related actions in response to the fault indication signal.

The fault indication signal line may be transmitted by the test signal detector 225 on the feedback control signal line of the bus 300 or the control signal line of the bus 300 used for indicating the assertion of the one or more test signals, where the control signal line is provided for bi-directional communication.

The fault indication signal may be transmitted over a communication link enabling data communication between the receiver 200 and the transmitter 100 of the interconnect system 10 and/or between the receiver 200 and an external unit such as the safety controller 350. The communication link is for instance established over an Ethernet communication link, a CAN (controller area network) bus communication link and the like allowing to communicate at least the fault indication signal. The communication link may be a side channel communication link between the receiver 200 and the transmitter 100. Such a side channel may be also used for indicating that the one or more test signals are asserted on the data signal lines $L_j$ to trigger the detection function of the test signal detector 225.

On detecting one or more defective data signal lines of the bus 300, the defect detector 225 indicates by the fault signal indication the one or more data signal lines identified to erroneously transmit data signals to the controller 220 controlling the line de-scrambler 210 of the video signal receiver 200 and to the controller 210 controlling the line scrambler 110 of the video signal transmitter 100.

In response to the fault signal indication, the line scrambler 110 is controlled by a control signal 150 issued by the controller 110 to selectively route the individual data signals of a data input to the output terminal $o_1$ to $o_N$ of the parallel interface 105 in accordance with the fault signal indication.

The line de-scrambler 210 is controlled by a control signal 250 issued by the controller 220 to selectively route the received individual data signals to the output terminal $o'_1$ to $o'_N$ of the line de-scrambler 210 to provide a restored data input.

The functionality of the line scrambler 110 and the line de-scrambler 210 will be fully understood on the basis of the description referring to FIG. 5 et seq. below.

Figure 5:
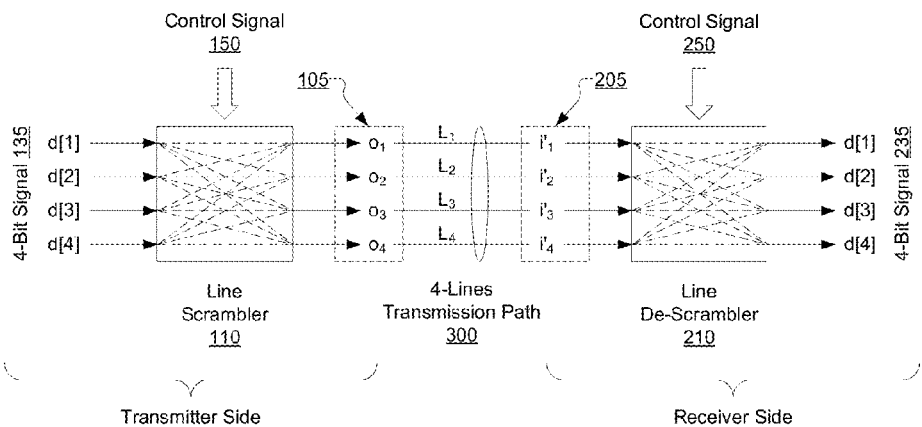
FIG. 5 illustrates a block diagram showing schematically signal line scrambling and de-scrambling according to an example of the present invention.

Referring now to FIG. 5, a block diagram of a line scrambler 110 at transmitter side and a line de-scrambler 210 at receiver side according to an example of the present application is schematically shown. A 4-bit data signal is provided to the line scrambler 110. The 4-bit data signal is to be transmitted through the bus 300 representing a data transmission path with at least 4 data signal lines or conductors, each for carrying a bi-level signal, in particular each for carrying a signal comprising a data bit.

The 4-bit data signal is supplied to the line scrambler 110 in a defined order according to the bit significances of the each data bit thereof. In particular, each data bit data signal of the 4-bit data signal are supplied to the input terminals $i_1$ to $i_4$ of the line scrambler 110. For the sake of explanation only, the bit significances are indexed staring with [1] representing the least significant bit (LSB) to [4] representing the most significant bit (MSB) of the 4-bit data signal.

In the unassigned, unmapped or default case, the bit data signal with bit significance [1], herein e.g. the least significant bit (LSB), is routed by the line scrambler 110 from the input terminal $i_1$ to output terminal $o_1$ of the parallel interface 105 on transmitter side, transmitted over the signal line $L_1$ of the bus 300 to data terminal $i'_1$ of the parallel interface 205 on receiver side and routed by the line de-scrambler 210 from the input terminal to output terminal $o'_1$ thereof. Further, the bit data signal with bit significance [2] is routed by the line scrambler 110 from the input terminal $i_2$ to data terminal $o_2$ of the parallel interface 105 on transmitter side, transmitted through the signal line $L_2$ of the bus 300 to data terminal $i'_2$ of the parallel interface 205 on receiver side and routed by the line de-scrambler 210 from the input terminal $i'_2$ to output terminal $o'_2$ thereof. Furthermore, the bit data signal with bit significance [3] is routed by the line scrambler 110 from the input terminal $i_3$ to data terminal $o_3$ of the parallel interface 105 on transmitter side, transmitted through the signal line $L_3$ of the bus 300 to data terminal $i'_3$ of the parallel interface 205 on receiver side and routed by the line de-scrambler 210 from the input terminal $i'_3$ to output terminal $o'_3$ thereof. And the bit data signal with bit significance [4], herein e.g. the most significant bit (MSB), is routed by the line scrambler 110 from the input terminal $i_4$ to data terminal $o_4$ of the parallel interface 105 on transmitter side, transmitted through the signal line $L_4$ of the bus 300 to data terminal $i'_4$ of the parallel interface 205 on receiver side and routed by the line de-scrambler 210 from the input terminal $i'_4$ to output terminal $o'_4$ thereof.

It should be noted that the data terminal $o_i$ of the parallel interface 105, which corresponds and is coupled to the output terminal $o_i$ of the line scrambler 110, is interconnected to via the data signal line $L_i$ of the bus 300 to the data terminal $i'_i$ of the parallel interface 205, which corresponds and is coupled to the output terminal $i'_i$ of the line de-scrambler 210, where i=1, . . . , 4 and in general i=1, . . . , N.

Based on a control signal 150 output by the controller 120 at transmitter side, each of the bit data signals of the 4-bit data signal is selectively routed by the line scrambler 110 to any of the data signal terminals $o_1$ to $o_4$ of the parallel interface 105 on transmitter side, wherein every bit data signal is selectively routed to another one of the data signal terminals $o_1$ to $o_4$. With respect to an order of the data signal terminals $o_1$ to $o_4$ of the parallel interface 105, the sequence of bit data signals thereat is permuted based on a control signal 150 with respect to the 4-bit data signal originally supplied to the line scrambler 110.

On receiver side, the bit data signals received at the terminals $i'_1$ to $i'_4$ of the parallel interface 205 is supplied to the line de-scrambler 210, which based on a control signal 250 output by the controller 220 at receiver side restores the original 4-bit data signal in accordance with the bit significances at the output terminals $o'_1$ to $o'_4$ of the line de-scrambler 210.

It should be noted that the functionality of the line scrambler 110 and the line de-scrambler 210 although described with reference to an exemplary 4-bit data signal is not limited thereto. In general, line scrambler 110 and the line de-scrambler 210 are likewise applicable also for a data signal with N bits. It should be further noted that the selective routing of the line scrambler 110 and the line de-scrambler 210 of sequences of N-bit received at N input terminals and output at N output terminals will be described in the following on a functional basis. Exemplary non-limiting implementations of the line scrambler 110 and the line de-scrambler 210 are illustrated in the following with reference to FIGS. 5 and 6.

An N-bit data signal is provided at the input of the line scrambler 110. The N-bit data signal d comprises a sequence of N input bits $d_i$, where i=1, . . . , N; i.e. d=[d[1], d[2], . . . , d[N]]=[$d_1, d_2, \ldots, d_N$], where d[i]=$d_i$=d AND $2^{i-1}$. The bit sequence is predefined by the bit significance of the respective input bits. The line scrambler 110 may be considered to permute the sequence of the N input bits with respect to the data terminals of the parallel interface 105 on receiver side. In other words, the line scrambler 110 performs a permutation π that maps the N-bit data signal referred to as a sequence d of bits into a bit sequence d' of new (permuted) order at the N data terminals of the parallel interface 105.

The permuted data sequence d' can be represented by d'=d·P, where P is an N×N permutation matrix P with a single 1 in each row and column, all other entries being zero. The permuted bit sequence d' is provided at the data terminals of the parallel interface 105 and transmitted over the bus 300 with at least N data signal lines to the data terminals of the parallel interface 205 on receiver side.

Every permutation π has a corresponding reverse permutation $π^{-1}$ that acts on the permuted bit sequence and restores it to its original order. The reverse permutation matrix can be represented simply by transposing of the permutation matrix $P^T$. Hence, d=d'·$P^T$ (=d·P·$P^T$=d·$I_N$), where $I_N$ is the N×N identity matrix).

The defect detector 225 may for instance detect that the line $L_k$ is defective. Based on the defect indication provided by the defect detector 225, the controller 120 generates a control signal 150, in accordance with which the line scrambler 110 selectively routes data signal d[1] (=$d_1$) comprising the least significant bit (LSB) of an N-bit data signal inputted to the line scrambler 110 to the output terminal $o_k$ thereof, to which the line $L_k$ is coupled via the data terminal $o_k$ of the parallel interface 105. The data signal comprising the least significant bit is originally routed by the line scrambler 110 to the output terminal $o_1$ thereof. Further, the line scrambler 110 selectively routes data signal d[k] (=$d_k$) originally routed to the output terminal $o_1$ thereof, to which the line $L_1$ is coupled via the data terminal $o_1$ of the parallel interface 105. Hence, the data signal d[k] (=$d_k$) having a higher bit significance (than the least significant bit) is transmitted on the line $L_1$.

Based on the defect indication provided by the defect detector 225, the controller 220 generates a control signal 250, in accordance with which the line de-scrambler 210 selectively routes the received reordered sequence of N bits at the data terminals i'$_1$ to i'$_N$ of the parallel interface 205 and the input terminals i'$_1$ to i'$_N$ of the line de-scrambler 210 such that the original order is restored at the input terminals o'$_1$ to o'$_N$ of the line de-scrambler 210. The restored N-bit data signal at the terminals o'$_1$ to o'$_N$ of the line de-scrambler 210 corresponds to the N-bit data signal originally input to the line scrambler 110 but with an unreliable value of the a least significant bit. The least significant bit of the restored N-bit data signal may be incorrect due to the erroneous signal transmission over data signal line $L_k$.

Further, the defect detector 225 may for instance detect that the line $L_h$ (h≠k) is also defective. Based on the defect indication provided by the defect detector 225, the line scrambler 110 further selectively routes data signal d[2] (=$d_2$) comprising data bit having a bit significance next higher relative to the least significant bit (LSB) of the N-bit data signal to the output terminal $o_h$ thereof, to which the line $L_h$ is coupled via the data terminal $o_h$ of the parallel interface 105. The data signal comprising the data bit data bit having a bit significance next higher is originally routed by the line scrambler 110 to the output terminal $o_2$ thereof. Further, the line scrambler 110 selectively routes data signal d[h] (=$d_h$) originally routed to the output terminal $o_2$ thereof, to which the line $L_2$ is coupled via the data terminal $o_2$ of the parallel interface 105. Hence, the data signal d[h] (=$d_h$) having a higher bit significance (than the least significant bit) is transmitted on the line $L_2$. Those skilled in the art understand that the above examples applies for h, k≠1, 2.

Those skilled in the art will immediately understand that an erroneously transmitted least significant bit (LSB) in a color component of pixels of an image may be perceived by a user/observer of the image but the contribution of the erroneous least significant bit (LSB) to the contrast in the displayed image is less significant or almost insignificant when using color component coding with several bits e.g. four bits or more.

Figure 6:
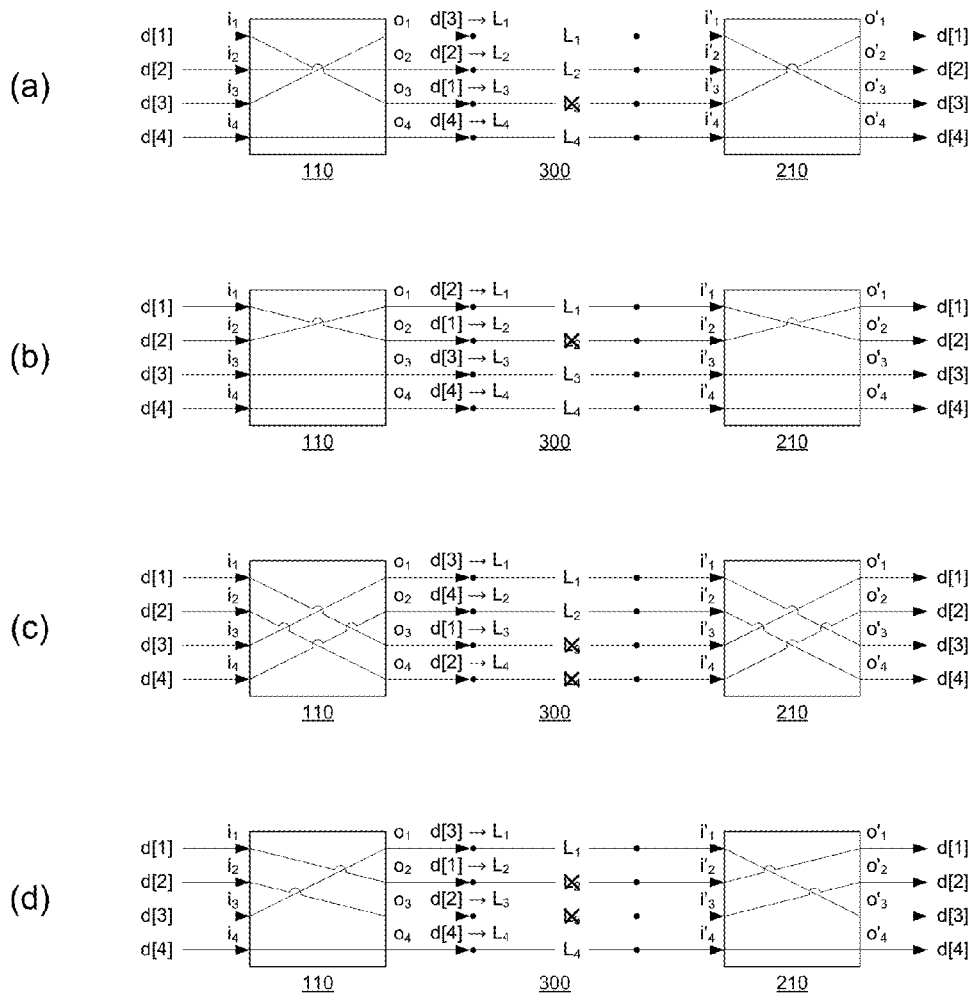
FIG. 6 schematically illustrates signal routing diagrams of exemplary line scrambling and line de-scrambling schemes in response to one or more defective data signal lines according to examples of the present invention.

Illustrating examples are shown in FIG. 6. The examples are illustrated on the basis of a 4-bit data signal and a line scrambler 110, a bus 300 and line de-scrambler 210 arranged accordingly. Those skilled in the art will appreciate that the present application is not limited to the exemplary 4-bit data signal.

In the examples, the 4-bit data signal d comprising a sequence of N=4 data bits d=[$d_1, d_2, \ldots, d_N$] in original order in accordance with the bit significances. The least significant bit (LSB) is the data bit d[1]=$d_1$ and the most significant bit (MSB) is the data bit d[4]=$d_4$.

In depiction (a) of FIG. 6, the signal line $L_3$ is detected to erroneously transmit data signals for the sake of explanation. The least significant bit d[1]=$d_1$ of the 4-bit data signal applied to input $i_1$ of the line scrambler 110 is routed by the line scrambler 110 based on a control signal 150 generated by the controller 120 in response to the feedback fault indication control signal from the defect detector 225 to the output terminal $o_3$, which is coupled to the data terminal $o_3$ of the parallel interface 105 and further the signal line $L_3$.

Every remaining data bit d[2]=$d_2$ to d[4]=$d_4$ is routed by the scrambler 110 based on the control signal 150 to a different remaining output terminal $o_1$, $o_2$ or $o_4$; herein except the output terminal $o_3$, which is coupled via the parallel interface 105 to the defective signal line $L_3$. As illustrated in depiction (a) of FIG. 4 for instance, the data bit d[3]=$d_3$ of the 4-bit data signal applied to input $i_1$ of the line scrambler 110 is routed by the line scrambler 110 to the output terminal $o_1$, which is coupled to the signal line $L_1$ via the data terminal $o_1$ of the parallel interface 105. The data bits d[2]=$d_2$ and d[4]=$d_4$ of the 4-bit data signal are routed according to the default case.

Hence, only least significant bit d[1]=$d_1$ may not be correctly transmitted to the receive side.

The signal routing of the line scrambler 110 can be denoted as a bit permutation operation in accordance with the permutation matrix $P_a$:

$$d' = d \cdot P_a$$

$$= (d_1 \quad d_2 \quad d_3 \quad d_4) \cdot \begin{pmatrix} 0 & 0 & 1 & 0 \\ 0 & 1 & 0 & 0 \\ 1 & 0 & 0 & 0 \\ 0 & 0 & 0 & 1 \end{pmatrix}$$

-continued
$$= (d_3 \quad d_2 \quad d_1 \quad d_4) \to (o_1 \quad o_2 \quad o_3 \quad o_4)$$

The signal routing of the line de-scrambler 210 can be denoted as a bit permutation operation in accordance with the reverse permutation matrix $P_a^T$:

$$d' \cdot P_a^T = (d_3 \quad d_2 \quad d_1 \quad d_4) \cdot \begin{pmatrix} 0 & 0 & 1 & 0 \\ 0 & 1 & 0 & 0 \\ 1 & 0 & 0 & 0 \\ 0 & 0 & 0 & 1 \end{pmatrix}^T$$

$$= (d_3 \quad d_2 \quad d_1 \quad d_4) \cdot \begin{pmatrix} 0 & 0 & 1 & 0 \\ 0 & 1 & 0 & 0 \\ 1 & 0 & 0 & 0 \\ 0 & 0 & 0 & 1 \end{pmatrix}$$

$$= (d_1 \quad d_2 \quad d_3 \quad d_4) \to (o'_1 \quad o'_2 \quad o'_3 \quad o'_4)$$

The permutation matrix $P_a$ can be obtained from a 4×4 identity matrix $I_4$ by swapping the third column and first column (representing the data bit signal with bit significance) in accordance with the defective signal line $L_3$, which is the third signal line.

In depiction (b) of FIG. 6, the signal line $L_2$ is detected to erroneously transmit data signals for the sake of explanation. The least significant bit $d[1]=d_1$ of the 4-bit data signal applied to input $i_1$ of the line scrambler 110 is routed by the line scrambler 110 based on a control signal 150 generated by the controller 120 in response to the feedback fault indication control signal from the defect detector 225 to the output terminal $o_2$, which is coupled to the data terminal $o_3$ of the parallel interface 105 and further the signal line $L_2$.

In turn, every remaining data bit $d[2]=d_2$ to $d[4]=d_4$ is routed by the scrambler 110 based on the control signal 150 to a different remaining output terminal $o_1$, $o_3$ or $o_4$; herein except the output terminal $o_2$, which is coupled via the parallel interface 105 to the defective signal line $L_2$. As illustrated in depiction (b) of FIG. 4 for instance, the data bit $d[2]=d_2$ of the 4-bit data signal applied to input $i_1$ of the line scrambler 110 is routed by the line scrambler 110 to the output terminal $o_1$, which is coupled to the signal line $L_1$ via the data terminal $o_1$ of the parallel interface 105. The data bits $d[3]=d_3$ and $d[4]=d_4$ of the 4-bit data signal are routed according to the default case.

Again, only least significant bit $d[1]=_d$ may not be correctly transmitted to the receive side.

The signal routing of the line scrambler 110 can be denoted as a bit permutation operation in accordance with the permutation matrix $P_b$:

$$d' = d \cdot P_b$$

$$= (d_1 \quad d_2 \quad d_3 \quad d_4) \cdot \begin{pmatrix} 0 & 1 & 0 & 0 \\ 1 & 0 & 0 & 0 \\ 0 & 0 & 1 & 0 \\ 0 & 0 & 0 & 1 \end{pmatrix}$$

$$= (d_2 \quad d_1 \quad d_3 \quad d_4) \to (o_1 \quad o_2 \quad o_3 \quad o_4)$$

The signal routing of the line de-scrambler 210 can be denoted as a bit permutation operation in accordance with the reverse permutation matrix $P_b^T$:

$$d' \cdot P_b^T = (d_2 \quad d_1 \quad d_3 \quad d_4) \cdot \begin{pmatrix} 0 & 1 & 0 & 0 \\ 1 & 0 & 0 & 0 \\ 0 & 0 & 1 & 0 \\ 0 & 0 & 0 & 1 \end{pmatrix}^T$$

$$= (d_2 \quad d_1 \quad d_3 \quad d_4) \cdot \begin{pmatrix} 0 & 1 & 0 & 0 \\ 1 & 0 & 0 & 0 \\ 0 & 0 & 1 & 0 \\ 0 & 0 & 0 & 1 \end{pmatrix}$$

$$= (d_1 \quad d_2 \quad d_3 \quad d_4) \to (o'_1 \quad o'_2 \quad o'_3 \quad o'_4)$$

The permutation matrix $P_b$ can be obtained from a 4×4 identity matrix $I_4$ by swapping the second column and first column (representing the data bit signal with bit significance) in accordance with the defective signal line $L_2$, which is the second signal line.

In depiction (c) of FIG. 6, the signal lines $L_3$ and $L_4$ are detected to erroneously transmit data signals for the sake of explanation. In case of more than one defective data signal lines, the data bits with increasing bit significance starting with the least significant bit are routed by the line scrambler 110 to the output terminals thereof, which are coupled to the signals lines detected as being defective.

The least significant bit $d[1]=d_1$ of the 4-bit data signal applied to input $i_1$ of the line scrambler 110 is routed by the line scrambler 110 based on a control signal 150 generated by the controller 120 in response to the feedback fault indication control signal from the defect detector 225 to the output terminal $o_3$, which is coupled to the data terminal $o_3$ of the parallel interface 105 and further the signal line $L_3$.

The data bit $d[2]=d_2$ of the 4-bit data signal, which is the data bit with the next higher bit significance, applied to input $i_2$ of the line scrambler 110 is routed by the line scrambler 110 based on the control signal 150 to the output terminal $o_4$, which is coupled to the data terminal $o_4$ of the parallel interface 105 and further the signal line $L_4$.

In turn, every remaining data bit $d[3]=d_3$ and $d[4]=d_4$ is routed by the scrambler 110 based on the control signal 150 to a different remaining output terminal $o_1$ and $o_2$; herein except the output terminals $o_3$ and $o_4$, which are coupled via the parallel interface 105 to the defective signal lines $L_3$ and $L_4$.

The least significant bit $d[1]=d_1$ and the data bit $d[2]=d_2$ with the next higher bit significance may not be correctly transmitted to the receive side.

The signal routing of the line scrambler 110 can be denoted as a bit permutation operation in accordance with the permutation matrix $P_c$:

$$d' = d \cdot P_c$$

$$= (d_1 \quad d_2 \quad d_3 \quad d_4) \cdot \begin{pmatrix} 0 & 0 & 1 & 0 \\ 0 & 0 & 0 & 1 \\ 1 & 0 & 0 & 0 \\ 0 & 1 & 0 & 0 \end{pmatrix}$$

$$= (d_3 \quad d_4 \quad d_1 \quad d_2) \to (o_1 \quad o_2 \quad o_3 \quad o_4)$$

The signal routing of the line de-scrambler 210 can be denoted as a bit permutation operation in accordance with the reverse permutation matrix $P_c^T$:

$$d' \cdot P_c^T = (d_3 \quad d_4 \quad d_1 \quad d_2) \cdot \begin{pmatrix} 0 & 0 & 1 & 0 \\ 0 & 0 & 0 & 1 \\ 1 & 0 & 0 & 0 \\ 0 & 1 & 0 & 0 \end{pmatrix}^T$$

$$= (d_3 \quad d_4 \quad d_1 \quad d_2) \cdot \begin{pmatrix} 0 & 0 & 1 & 0 \\ 0 & 0 & 0 & 1 \\ 1 & 0 & 0 & 0 \\ 0 & 1 & 0 & 0 \end{pmatrix}$$

$$= (d_1 \quad d_2 \quad d_3 \quad d_4) \rightarrow (o'_1 \quad o'_2 \quad o'_3 \quad o'_4)$$

The permutation matrix $P_b$ can be obtained from an 4×4 identity matrix $I_4$ by first swapping the third column and first column (representing the data bit signal with bit significance) in accordance with the defective signal line $L_3$, which is the third signal line, and further swapping the fourth column and second column (representing the data bit signal with bit significance next to the data bit signal representing the least significant bit) in accordance with the defective signal line $L_4$, which is the fourth signal line.

In depiction (d) of FIG. 6, the signal lines $L_2$ and $L_3$ are detected to erroneously transmit data signals for the sake of explanation.

The least significant bit $d[1]=d_1$ of the 4-bit data signal applied to input $i_1$ of the line scrambler 110 is routed by the line scrambler 110 based on a control signal 150 generated by the controller 120 in response to the feedback fault indication control signal from the defect detector 225 to the output terminal $o_2$, which is coupled to the data terminal $o_2$ of the parallel interface 105 and further the signal line $L_2$.

The data bit $d[2]=d_2$ of the 4-bit data signal, which is the data bit with the next higher bit significance, applied to input $i_2$ of the line scrambler 110 is routed by the line scrambler 110 based on the control signal 150 to the output terminal $o_3$, which is coupled to the data terminal $o_3$ of the parallel interface 105 and further the signal line $L_3$.

In turn, every remaining data bit $d[3]=d_3$ and $d[4]=d_4$ is routed by the scrambler 110 based on the control signal 150 to a different remaining output terminal $o_1$ and $o_4$; herein except the output terminals $o_2$ and $o03$, which are coupled via the parallel interface 105 to the defective signal lines $L_2$ and $L_3$.

Again, the least significant bit $d[1]=d_1$ and the data bit $d[2]=d_2$ with the next higher bit significance may not be correctly transmitted to the receive side.

The signal routing of the line scrambler 110 can be denoted as a bit permutation operation in accordance with the permutation matrix $P_d$:

$$d' = d \cdot P_d$$

$$= (d_1 \quad d_2 \quad d_3 \quad d_4) \cdot \begin{pmatrix} 0 & 1 & 0 & 0 \\ 0 & 0 & 1 & 0 \\ 1 & 0 & 0 & 0 \\ 0 & 0 & 0 & 1 \end{pmatrix}$$

$$= (d_3 \quad d_1 \quad d_2 \quad d_4) \rightarrow (o_1 \quad o_2 \quad o_3 \quad o_4)$$

The signal routing of the line de-scrambler 210 can be denoted as a bit permutation operation in accordance with the reverse permutation matrix $P_d^T$:

$$d' \cdot P_d^T = (d_3 \quad d_1 \quad d_2 \quad d_4) \cdot \begin{pmatrix} 0 & 1 & 0 & 0 \\ 0 & 0 & 1 & 0 \\ 1 & 0 & 0 & 0 \\ 0 & 0 & 0 & 1 \end{pmatrix}^T$$

$$= (d_3 \quad d_1 \quad d_2 \quad d_4) \cdot \begin{pmatrix} 0 & 0 & 1 & 0 \\ 1 & 0 & 0 & 0 \\ 0 & 1 & 0 & 0 \\ 0 & 0 & 0 & 1 \end{pmatrix}$$

$$= (d_1 \quad d_2 \quad d_3 \quad d_4) \rightarrow (o'_1 \quad o'_2 \quad o'_3 \quad o'_4)$$

The permutation matrix $P_b$ can be obtained from an 4×4 identity matrix $I_4$ by first swapping the second column and first column in accordance with the defective signal line $L_2$, which is the second signal line, and further swapping the third column and first column (to which the data bit signal with the bit significance next to the bit data signal comprising the least significant bit is routed in accordance with first swapping operation) in accordance with the defective signal line $L_3$, which is the third signal line.

Examples of the line scrambler 110 and line de-scrambler 120 are schematically shown in the following FIGS. 5 and 6.

The line scrambler 110 and line de-scrambler 120 may each comprise an N×N crossbar switch with N source nodes/input terminals and N destination nodes/output terminals. Every input terminal is selectively connectable to every output terminal. Signals applied to the input terminals are simultaneously routed to the respective selected output terminals without conflicts Hence, N controllably selective separate connections are established each from a different one of the N input terminals to a different one of the N output terminals.

Figure 7A:
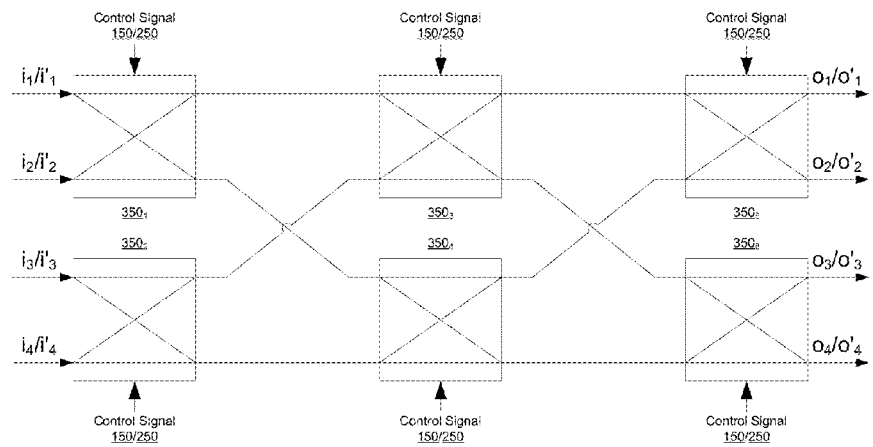
FIG. 7(a) shows a schematic block diagram of an exemplary switching network implementable in a line scrambler and a line de-scrambler according to an example of the present invention.

Another type of non-blocking interconnect topology, which enables simultaneous transmission of data signals from every input terminal to every output terminal without conflicts is shown in FIG. 7(a), which schematically illustrates a block diagram of an exemplary 4×4 Benes network or 4×4 Benes switch. The Benes network is constructed with 2×2 crossbar switches and is in particular re-arrangeably non-blocking. A network may be understood as re-arrangeably non-blocking if once the permutation from input terminals to output terminals is known, the network can then be rearranged to The exemplary 4×4 Benes network shown herein for the sake of explanation comprises four input terminals $i_1/i'_1$ to $i_4/i'_4$, six 2×2 crossbar switches $350_1$ to $350_6$ and four output terminals $o_1/o'_1$ to $o_4/o'_4$. Each crossbar switch $350_1$ to $350_6$ is controlled by the controller 150 and the controller 250, respectively, to route the input signals at every input terminal $i_1/i'_1$ to $i_4/i'_4$ to every respective output terminal $o_1/o'_1$ to $o_4/o'_4$ in accordance with any permutation and reverse permutation, respectively.

The exemplary 4×4 Benes switch of FIG. 7(a) may be implemented in the line scrambler 110 and line de-scrambler 210 described above.

It should be noted that the non-blocking interconnect topology is generally known to those skilled in the art as banyan networks, which are defined to be multi-stage networks that have exactly one signal path from any input terminal to any output terminal. Multi-stage logarithmic networks are a subset of banyan networks that are typically constructed using 2×2 crossbar switches. The above exemplified Benes network is one example of multi-stage logarithmic networks, which further for instance include the Omega network and the Butterfly network. The Omega network and the Butterfly network are delta networks, a subset of banyan networks that are self-routing.

Figure 7B:
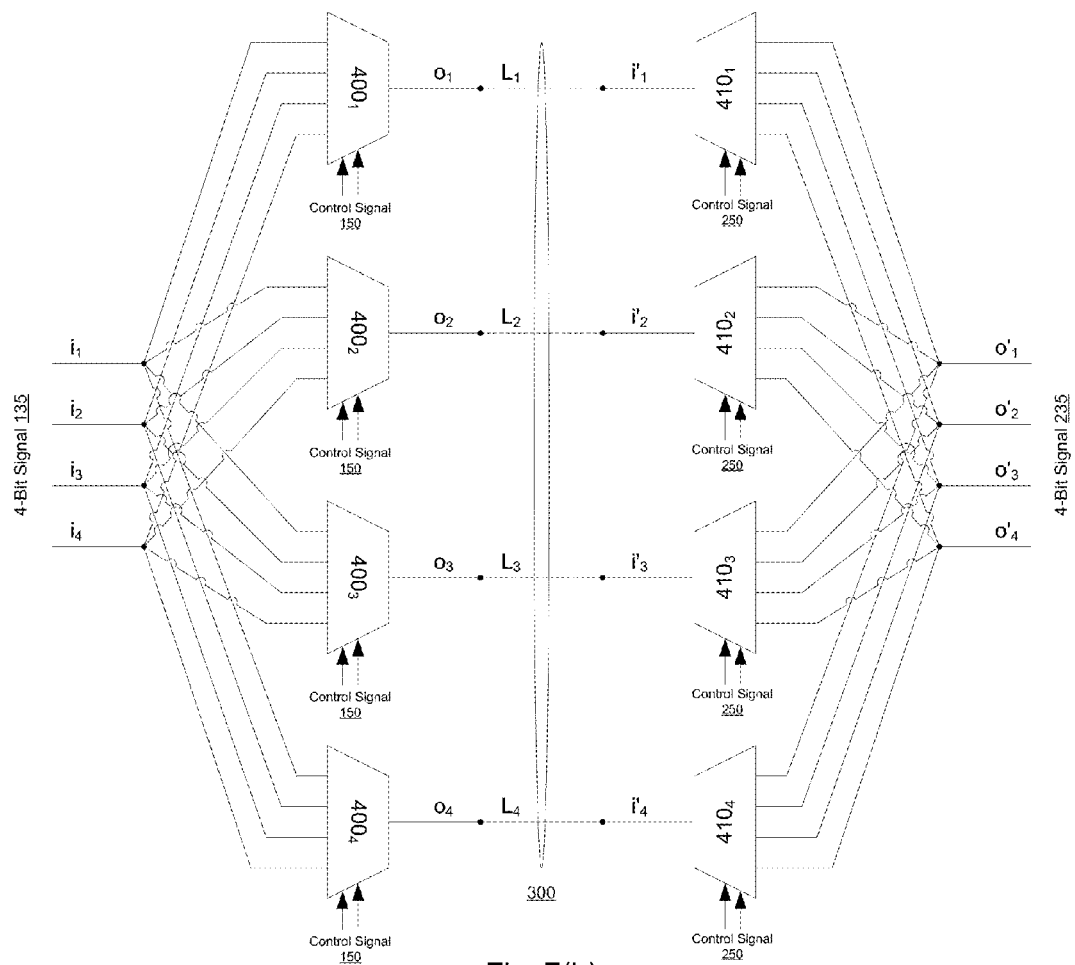
FIG. 7(b) shows a schematic block diagram of exemplary multiplexer arrangements implementable in a line scrambler and a line de-scrambler according to another example of the present invention.

Referring now to FIG. 7(b), a schematic block diagram of further implementation examples of the line scrambler 110 and line de-scrambler 120 is shown.

The example line scrambler 110 comprises four 4×1 multiplexers (MUXs), which are selectively switched under control of the controller 120. The four 4×1 multiplexers (MUXs) enable to route data signals at every input terminal $i_1$ to $i_4$ to every output terminal $o_1$ to $o_4$ without conflicts. Analogously, the example line de-scrambler 210 comprises four 1×4 multiplexers (MUXs), which are selectively switched under control of the controller 220. The four 1×4 multiplexers (MUXs) enable to route data signals at every input terminal $i'_1$ to $i'_4$ to every output terminal $o'_1$ to $o'_4$ without conflicts. Hence, a line scrambler 110 and a line de-scrambler 210 implemented on the basis multiplexers as exemplified in FIG. 7(b) likewise enable to route the input signals at every input terminal $i_1/i'_1$ to $i_4/i'_4$ to every respective output terminal $o_1/o'_1$ to $o_4/o'_4$ in accordance with any permutation and reverse permutation, respectively.

Those skilled in the art will immediately understand that a more general implementation of a line scrambler 110 may comprise N N×1 multiplexers for accepting an N-bit data signal and outputting a permuted sequence of N data bits and a line de-scrambler 210 may comprise N 1×N multiplexers for accepting the permuted sequence of N data bits and outputting the restored N-bit data signal.

Those skilled in the art understand that the above implementations are merely exemplary but not limiting. Alternative implementations may be used for the line scrambler 110 and line de-scrambler 210 enabling the same functionality as described above with reference to the various exemplary implementations.

Referring now to FIG. 8, the transmission of a pixel data over the bus 300 having parallel data signal lines and interconnecting the video signal transmitter 100 and video signal receiver 200 of the interconnect system 10 is schematically illustrated. For the sake of exemplification only, the pixel data, which should be understood as a pixel data of a video data stream, comprises three components, herein denoted as component signals r, g and b according to an RGB color coding scheme. Further, every component signal is representable by a 3-bit data signal or 2-bit data signal, again for the sake of exemplification only.

Those skilled in the art will immediately understand that illustrated example is adaptable to any number of components. Those skilled in the art will immediately understand that illustrated example is also adaptable to component signals representable by data signals with differing number of bits.

The line scrambler 110 on transmitter side has three subunits 110₁ to 110₃. Each subunit 110₁ to 110₃ has the above described functionality of a line scrambler 110. Herein, the subunits 110₁ and 110₂ have each input terminals $i_1$ to $i_3$ and output terminals $o_1$ to $o_3$. For instance, the 3-bit data signal of the red component signal of a pixel is supplied to the subunit 110₁ and the 3-bit data signal of the green component signal of a pixel is supplied to the subunit 110₂. The subunit 110₃ has input terminals $i_1$ and $i_2$ and output terminals $o_1$ and $o_2$. For instance, the 2-bit data signal of the blue component signal of a pixel is supplied to the subunit 110₃.

The line de-scrambler 210 on receiver side has three subunits 210₁ to 210₃. Each subunit 210₁ to 210₃ has the above described functionality of a line de-scrambler 120. Herein, the subunits 210₁ and 210₂ have each input terminals $i'_1$ to $i'_3$ and output terminals $o'_1$ to $o'_3$. For instance, the 3-bit data signal of the red component signal of a pixel is supplied to the subunit 210₁ and the 3-bit data signal of the green component signal of a pixel is supplied to the subunit 210₂. The subunit 210₃ has input terminals $i'_1$ and $i'_2$ and output terminals $o'_1$ and $o'_2$. For instance, the 2-bit data signal of the blue component signal of a pixel is supplied to the subunit 210₃.

The subunits of the line scrambler 110 are individually controlled in response to a defective data signal line signalized to the controller 120 as schematically illustrated in depiction (a) and depiction (b) of FIG. 8. The selective routing schemes shown in FIG. 8 are fully understood on the basis of the above description.

For the above description, those skilled in the art understand that the bit sequence of every component may be separately, selectively routed by the line scrambler 110 to obtain permuted bit sequences at the output terminals of the parallel interface 105 on transmitter side and restored bit sequences at the output terminals of the line de-scrambler 210 in response to the detection of a signal line erroneously transmitting a data signal asserted thereon.

The each components of pixel-wise transmitted image data comprise a predefined number of bits. As described with reference to FIG. 2, a pixel data comprises individual components relating to color and/or transparency information. For instance, the components may comprise RGB coded color components, which comprise $N_R$ bits for the red component, $N_G$ bits for the green component and $N_B$ bits for the blue component, and optionally an alpha component with $N_\alpha$ bits.

The components of pixel-wise transmitted image data are considered as one composed bit sequence with e.g. $N=N_R+N_G+N_B (+N_\alpha)$ bits. The one composed N-bit data signal may be selectively routed by the line scrambler 110 to obtain permuted bit sequences of the one composed N-bit data signal at the output terminals of the parallel interface 105 on transmitter side and restored bit sequences at the output terminals of the line de-scrambler 210 in response to the detection of a signal line erroneously transmitting a data signal asserted thereon.

The routing of the line scrambler 110 and the line de-scrambler 210 are described above with reference to an N-bit data signal, which comprises a least significant bit (LSB) and a most significant bit (MSB). The bit data signals of the N-bit data signal are routed by the line scrambler 110 to the output terminals detachably coupled to the one or more defective data signal lines starting with bit data signal comprising the least significant bit (LSB) and continuing with the bit data signal with increasing bit significance.

The aforementioned composed N-bit data signal comprises two or more $N_i$-bit data signals, each of which represents an $M_i$-bit data signal comprising a least significant bit (LSB) and a most significant bit (MSB). In particular, the composed N-bit data signal is formed by concatenating the sequences of bit data signals of the comprised two or more $M_i$-bit data signals. For selectively routing first the data signals with the least significant bits (LSB) to defective lines, a predetermined significance level is associated to each of the bit data signals of the composed N-bit data signal. The selective routing of the bit data signs to one or more defective lines is based on the associated significance levels sig=(sig[1], . . . , sig[N]) starting with the lowest associated significance level and continuing with increasing associated significance level.

Figure 9:
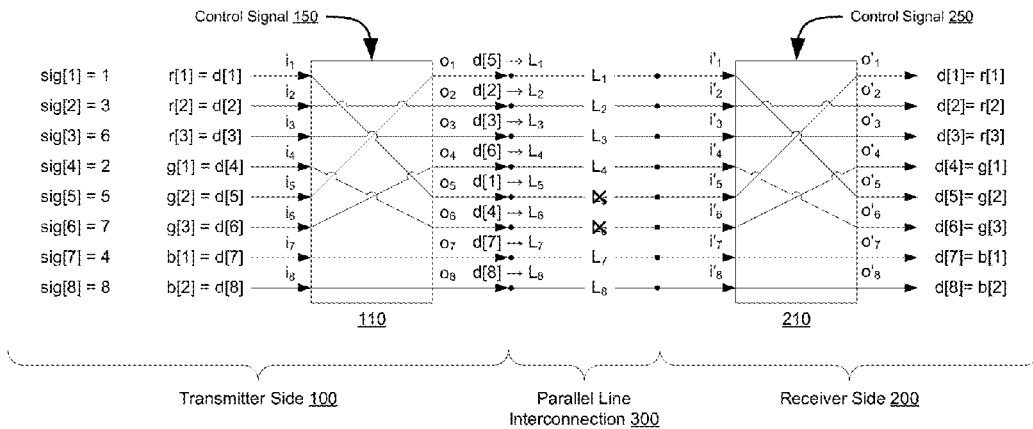
FIG. 9 schematically illustrates signal routing diagrams of further exemplary line scrambling and de-scrambling schemes according to examples of the present invention.
Figure 9:
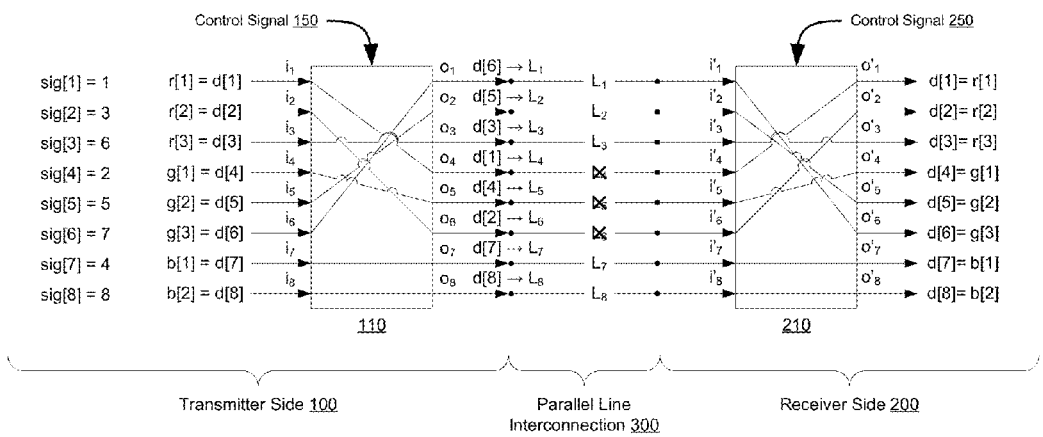
Figure 9:
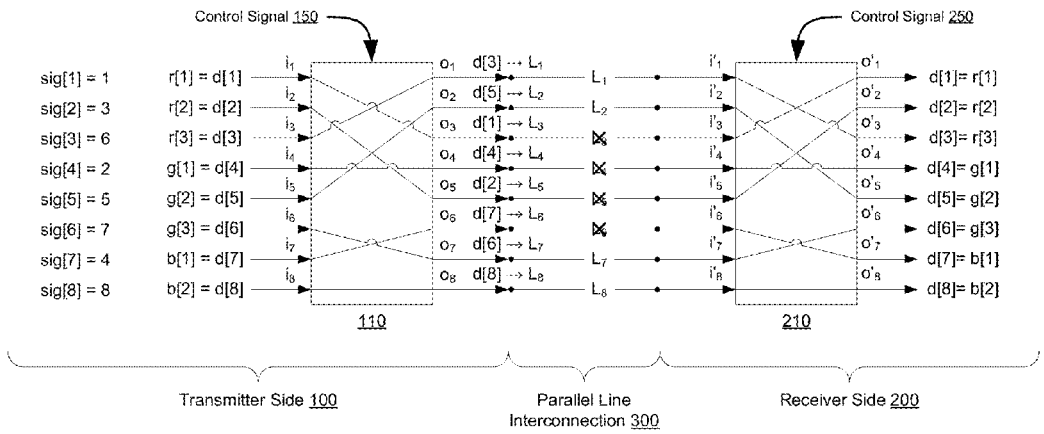

Referring now to FIG. 9, selective routing schemes applied to an exemplary composed N-bit data signal are schematically illustrated.

The exemplifying composed N-bit data signal d comprises a sequence of 8 data bit signals, which are formed of a concatenation of component data signals, which are a 3-bit data signal r=(r[1], r[2], r[3]) representing exemplarily a red component of a pixel data, a 3-bit data signal g=(g[1], g[2], g[3]) representing exemplarily a green component of a pixel data, and a 2-bit data signal b=(b[1], b[2]) representing exemplarily a blue component of a pixel data. Without limiting the present application thereto, the composed N-bit data signal results to $$d = (d[1], d[2], d[3], d[4], d[5], d[6], d[7], d[8])$$
$$= (r[1], r[2], r[3], g[1], g[2], g[3], b[1], b[2]).$$

Assuming, without limiting thereto, that r[1], g[1] and b[1] represent the least significant bit data signals of the respective component data signal and r[3], g[3] and b[2] represent the most significant bit data signals of the respective component data signal.

Further, an exemplary sequence of associated significance levels is predetermined. The associated significance level may be predetermined with regard to the bit significance of the individual bit data signals of the respective component data signal and further with regard to the component data signals with regard to each other.

For the sake of description, a sequence of significance levels sig=(sig[1], . . . , sig[8]) to is considered, which differing from each other and assign an individual significance level to every bit data signal of the composed N-bit data signal d;

| Index j | Data signal d[j] | Significance level sig[j] |
|---|---|---|
| 1 | r[1] | 1 |
| 2 | r[2] | 3 |
| 3 | r[3] | 6 |
| 4 | g[1] | 2 |
| 5 | g[2] | 4 |
| 6 | g[3] | 7 |
| 7 | b[1] | 5 |
| 8 | b[2] | 8 |

In response to e.g. k defective data signal lines $L_j$, k data signals associated with the k lowest significance levels. Hence, in case of one defective data signal line, the data signal d[1] is selectively routed to the one defective line.

In case of two defective data signal lines, e.g. data signal lines $L_5$ and $L_6$ as illustrated in the scheme presented in depiction (a) of FIG. 9, the data signals d[1] and d[4] are selectively routed to the defective lines $L_5$ and $L_6$, since the two lowest significance levels sig[1]=1 and sig[4]=2 are assigned to the data signals d[1] and d[4], respectively. The signal routing of the line scrambler 110 can be denoted as a bit permutation operation in accordance with the permutation matrix $P_{c1}$:

$$d' = d \cdot P_{c1}$$

$$= (d_1\ d_2\ d_3\ d_4\ d_5\ d_6\ d_7\ d_8) \cdot \begin{pmatrix} 0 & 0 & 0 & 0 & 1 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 1 & 0 & 0 \\ 1 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}$$

$$= (d_5\ d_2\ d_3\ d_6\ d_1\ d_4\ d_7\ d_8)$$

The signal routing of the line de-scrambler 210 can be denoted as a bit permutation operation in accordance with the reverse permutation matrix $P_{c1}^T$:

$$d = d' \cdot P_{c1}^T$$

$$= (d_5\ d_2\ d_3\ d_6\ d_1\ d_4\ d_7\ d_8) \cdot \begin{pmatrix} 0 & 0 & 0 & 0 & 1 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 1 & 0 & 0 \\ 1 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}^T$$

$$= (d_5\ d_2\ d_3\ d_6\ d_1\ d_4\ d_7\ d_8) \cdot \begin{pmatrix} 0 & 0 & 0 & 1 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 1 & 0 & 0 \\ 1 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}$$

$$= (d_1\ d_2\ d_3\ d_4\ d_5\ d_6\ d_7\ d_8)$$

Furthermore, in case of three defective data signal lines, e.g. data signal lines $L_4$, $L_5$ and $L_6$ as illustrated in the scheme presented in depiction (b) of FIG. 9, the data signals d[1], d[4] and d[2] are selectively routed to the defective lines $L_4$, $L_5$ and $L_6$, since the two lowest significance levels sig[1]=1, sig[4]=2 and sig[2]=3 are assigned to the data signals d[1], d[4] and d[2], respectively. The signal routing of the line scrambler 110 can be denoted as a bit permutation operation in accordance with the permutation matrix $P_{c2}$:

$$d' = d \cdot P_{c2}$$

$$= (d_1\ d_2\ d_3\ d_4\ d_5\ d_6\ d_7\ d_8) \cdot \begin{pmatrix} 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}$$

$$= (d_6\ d_5\ d_3\ d_1\ d_4\ d_2\ d_7\ d_8)$$

The signal routing of the line de-scrambler 210 can be denoted as a bit permutation operation in accordance with the reverse permutation matrix $P_{c2}^T$:

$$d = d' \cdot P_{c2}^T$$

$$= (d_6 \ d_5 \ d_3 \ d_1 \ d_4 \ d_2 \ d_7 \ d_8) \cdot \begin{pmatrix} 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}^T$$

$$= (d_6 \ d_5 \ d_3 \ d_1 \ d_4 \ d_2 \ d_7 \ d_8) \cdot \begin{pmatrix} 0 & 0 & 0 & 0 & 0 & 1 & 0 & 0 \\ 0 & 0 & 0 & 0 & 1 & 0 & 0 & 0 \\ 0 & 0 & 1 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \end{pmatrix}$$

$$= (d_1 \ d_2 \ d_3 \ d_4 \ d_5 \ d_6 \ d_7 \ d_8)$$

Furthermore, in case of four defective data signal lines, e.g. data signal lines $L_3$, $L_4$, $L_5$ and $L_6$ as illustrated in the scheme presented in depiction (c) of FIG. 9, the data signals d[1], d[4], d[2] and d[7] are selectively routed to the defective lines $L_3$, $L_4$, $L_5$ and $L_6$, since the two lowest significance levels sig[1]=1, sig[4]=2, sig[2]=3 and sig[7]=4 are assigned to the data signals d[1], d[4], d[2] and d[7], respectively. The signal routing of the line scrambler 110 can be denoted as a bit permutation operation in accordance with the permutation matrix $P_{c3}$:

$$d' = d \cdot P_{c3}$$

$$= (d_1 \ d_2 \ d_3 \ d_4 \ d_5 \ d_6 \ d_7 \ d_8) \cdot \begin{pmatrix} 0 & 0 & 1 & 0 & 0 & 0 & 0 & 0 \\ 0 & 0 & 0 & 0 & 1 & 0 & 0 & 0 \\ 1 & 0 & 0 & 0 & 0 & 0 & 0 & 0 \\ 0 & 0 & 0 & 1 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{pmatrix}$$

$$= (d_3 \ d_5 \ d_1 \ d_4 \ d_2 \ d_7 \ d_6 \ d_8)$$

The signal routing of the line de-scrambler 210 can be denoted as a bit permutation operation in accordance with the reverse permutation matrix $P_{c3}^T$:

$$d = d' \cdot P_{c3}^T$$

$$= (d_3 \ d_5 \ d_1 \ d_4 \ d_2 \ d_7 \ d_6 \ d_8) \cdot \begin{pmatrix} 0 & 0 & 1 & 0 & 0 & 0 & 0 & 0 \\ 0 & 0 & 0 & 0 & 1 & 0 & 0 & 0 \\ 1 & 0 & 0 & 0 & 0 & 0 & 0 & 0 \\ 0 & 0 & 0 & 1 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{pmatrix}^T$$

$$= (d_3 \ d_5 \ d_1 \ d_4 \ d_2 \ d_7 \ d_6 \ d_8) \cdot \begin{pmatrix} 0 & 0 & 1 & 0 & 0 & 0 & 0 & 0 \\ 0 & 0 & 0 & 0 & 1 & 0 & 0 & 0 \\ 1 & 0 & 0 & 0 & 0 & 0 & 0 & 0 \\ 0 & 0 & 0 & 1 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{pmatrix}$$

$$= (d_1 \ d_2 \ d_3 \ d_4 \ d_5 \ d_6 \ d_7 \ d_8)$$

The functionality of the line scrambler 110 and line de-scrambler 210 may be understood as a selective controllable signal routing based on an interchanging, exchanging, swapping, re-assigning, or binding of non-conflicting connections between N input terminals each accepting a data signal, in particular a bi-level data signal, and N output terminals each providing one of the inputted data signals. The function of the line scrambler 110 and line de-scrambler 210 may be performed by a switch, a switching network or a switch arrangement, however the use of the term "switch" does not serve to limit the specific implementation of the function to a discrete device; any mechanism that achieves the interchanging, exchanging, re-assignment, swapping, or binding of the non-conflicting connections may be used. For convenience, the term "switch" when applied to this aspect of the system, apparatus, or method is meant to encompass the range of techniques, which are available to perform the function. Such techniques may also use memory storage locations, operation of a state machine or a stored program computer, and dedicated electronic logic circuits and the like, either alone or in combination.

Those skilled in the art further understand on the basis of the above description that the above described signal interconnect system 10 may be also applied for transmitting an N-symbol data signal from the transmitter to the receiver via the parallel bus. Each of the N data signal lines $L_j$ of the parallel bus is capable of transmitting a signal comprising one data symbol. Hence, the N data symbols of the N-symbol data signal are concurrently transmittable over the parallel bus.

Such a data symbol may code one, two or more data bits. For instance a data symbol coding one data bits may be signalized over a data signal line $L_j$ using a bi-level signal as illustrated in detail above. A data symbol coding two data bits may be signalized over a data signal line $L_j$ using a 4-level signal. More generally, a data symbol coding M data bits may be signalized over a data signal line $L_j$ using a $2^M$-level signal.

The line scrambler 110 is analogously applicable to selectively route the N-symbol data signal, which is input to the N input terminal $i_1$ to $i_N$, to the N output terminals $o_1$ to $o_N$ in accordance with a permutation $\pi_k$ to provide a permuted sequence d' of the N-symbol data signal at the output terminals $o_1$ to $o_N$ thereof.

The line de-scrambler is also analogously applicable selectively route permuted sequence d' of the N-symbol data signal, which is input to the N input terminal $i'_1$ to $i'_N$, to the N output terminals $o'_1$ to $o'_N$ in accordance with the corresponding reverse permutation $\pi^{-1}_k$ to provide the restored N-symbol data signal d at the output terminals $o'_1$ to $o'_N$ thereof.

According to an example of the present application, an interconnect system for transmitting a stream of N-symbol data signals over an error prone wired connection is provided. The system comprises a parallel bus 300, a line scrambler 110, a line de-scrambler 210 and a defect detector 225.

The parallel bus 300 has at least N data signal lines $L_j$ (j=1, ..., N). Every data signal line $L_j$ is capable of transmitting a signal comprising one data symbol. The line scrambler 110 has N output terminals $o_i$. Every output terminal $o_i$ is provided for outputting one data symbol signal. The line de-scrambler 210 has N input terminals $i'_j$. Every input terminals $i'_j$ is provided for accepting one data symbol signal. The defect detector 225 is configured to detect one or more defective data signal lines $L_k$ (k ∈[1, N]). Every output terminal $o_j$ of the line scrambler 110 is coupled via a different data signal line $L_j$ of the parallel bus 300 to every respective input terminal $i'_j$ of the line de-scrambler 210, The line scrambler 110 is configured to accept an N-symbol data signal d having a sequence of data symbols in a predefined order and to output a permuted sequence d' of data symbols at its N output terminals $o_j$. A predefined significance level is assigned to every data symbol. The significance level extends from a lowest significance level to a highest significance level. The one or more data symbols $d_1$ of the N-symbol data signal d, which have lowest significance levels, are output at its one or more output terminals $o_k$, which are coupled to the one or more defective data signal lines $L_k$.

The line de-scrambler 210 is configured to accept the permuted sequence d' of data symbols at its input terminal $i'_j$, to restore the predefined order of the data symbols from the permuted sequence d' of data symbols; and to output the restored N-symbol data signal d comprising a sequence of data symbols in the predefined order.

According to an example of the present application, the line scrambler 110 is further configured to route the one or more data symbols $d_k$ with the lowest significance levels to the output terminals $o_k$ of the line scrambler 110, which output terminals $o_k$ are coupled to the one or more defective data signal lines $L_k$ and to route every remaining data symbol $d_j$ to one different output terminal $o_j$.

According to an example of the present application, the permuted sequence d' of data symbols is representable by a permutation $\pi_k$ applied to a sequence of data symbols in predefined order comprised by the N-symbol data signal (d). The line de-scrambler 210 has N output terminals $o'_j$ each for outputting a signal comprising one data symbol. The line de-scrambler 210 is further configured to selectively route each data symbol of the permuted sequence d' to one different output terminal $o'_j$ of the line de-scrambler 210 in accordance with the corresponding reverse permutation $\pi_k^{-1}$.

According to an example of the present application, the defect detector 225 is configured to initiate a fault indication on the feedback communication connection in response to detecting the one or more defective data signal lines $L_k$.

According to an example of the present application, the feedback communication connection is at least one of a side channel communication connection or a feedback control signal line comprises by the parallel bus.

According to an example of the present application, the interconnect system further comprises a test signal generator 125 configured to assert one or more predetermined test signals on the at least N data signal lines $L_j$ of the parallel bus 300.

According to an example of the present application, the defect detector 225 is further configured to detect the one or more predetermined test signals in order to detect an erroneous data signal transmission on the defective data signal line $L_k$.

According to an example of the present application, the parallel bus (300) is a detachable connection.

According to an example of the present application, wherein the N-symbol data signal comprises at least one N-symbol component of a pixel of image data.

According to an example of the present application, the N-symbol data signal comprises of two or more $N_i$-symbol data signals. The $N_i$-symbol data signals comprises a sequence of $N_i$ data symbols. The N-symbol data signal is formed by concatenating the individual sequences of $N_i$ data symbols.

According to an example of the present application, the significance levels are predefined. Every significance level is assigned to one of the data symbols of the sequence thereof.

According to an example of the present application, the interconnect system further comprises a video signal transmitter 100 including the line scrambler 110 and a video signal receiver 200 including the line de-scrambler 210 and the defect detector 225. The video signal transmitter 100 and the video signal receiver 200 are coupled via the parallel bus 300. The stream of N-symbol data signals is a stream of pixel data signals each comprising at least one component of a pixel data.

According to an example of the present application, the interconnect system further comprises a parallel interface (105) arranged with the video signal transmitter (100) directly coupled to the line scrambler (110) and a parallel interface (205) arranged with the video signal receiver (200) and directly coupled to the line de-scrambler (210). The parallel bus (300) is detachably coupled to the parallel interfaces (105, 205).

According to an example of the present application, the line scrambler 110 comprises several line scrambler subunits 110₁ to 110₃, each of which is configured to output a permuted sequence d' of data symbols for a respective one component of several components of a pixel data signal.

According to an example of the present application, a video signal transmitter for transmitting a stream of image data signals over an error prone wired connection to a video signal receiver. The video signal transmitter 100 and the video signal receiver 200 form an interconnect system 10.

The video signal transmitter 100 comprises a parallel interface 105 comprising at least N data terminals oj each capable of outputting a signal comprising one data symbol and a line scrambler 110 having N output terminals oj each capable of outputting a signal comprising one data symbol. The parallel interface 105 is provided for being coupled to a parallel bus 300 having at least N data signal lines. Each data signal line Lj capable of transmitting a signal comprising one data symbol. Every output terminal oj of the line scrambler 110 is fixedly coupled to one different data terminals oj of the parallel interface 105, The line scrambler 110 is configured to accept at least a color component signal of a pixel of the image data, and to output a permuted sequence d' of data symbols at the N output terminals of the line scrambler 110. The color component signal comprises an N-symbol data signal d having a sequence of N data symbols in a predefined order. The one or more data symbols of the N-symbol data signal d, which have the lowest significance levels, are output at the one or more output terminals $o_k$ of the line scrambler 110, which are coupled to one or more defective data signal lines $L_k$ detected by feedback fault indication transmitted by the video signal receiver 200.

According to an example of the present application, the line scrambler 110 is further configured to route the one more data symbol to the output terminals of the line scrambler 110, which are coupled to the one or more defective data signal lines $L_k$ and to route every remaining data symbol to one different output terminal $o_j$.

According to an example of the present application, the parallel bus 300 has further a control signal line capable of transmitting a data sampling signal or pixel clock. The N-symbol data signal is transmitted in synchronicity with the data sampling signal over the parallel bus 300. The data symbol signals of the N-symbol data signal are transmitted as substantially the same time on the data signal lines of the bus 300.

According to an example of the present application, the N-symbol data signal is synchronized on at least one of the edges of the data sampling signal or pixel clock.

According to an example of the present application, the video signal transmitter further comprises a controller 120, which is coupled to the line scrambler 110 to supply a control signal 150 thereto. The controller 120 is configured to receive the fault indication from the video signal receiver 200, wherein the fault indication indicates the one or more data signal line $L_k$ detected as defective.

According to an example of the present application, the video signal transmitter further comprises a test signal generator 125, which is configured to assert one or more predetermined test signals on the at least N data signal lines $L_j$ of the parallel bus 300 via the parallel interface 105.

According to an example of the present application, a video signal receiver for receiving a stream of image data signals over an error prone wired connection to a video signal transmitter. The video signal transmitter 100 and the video signal receiver 200 form an interconnect system 10.

The video signal receiver 200 comprises a parallel interface 205 comprising at least N data terminals $i'_j$ and a line de-scrambler 210 having N input terminals $i'_j$ each for accepting a signal comprising one data symbol. The parallel interface 205 is provided for being coupled to a parallel bus 300 having at least N data signal lines $L_j$. Each data signal line $L_j$ capable of transmitting a signal comprising one data symbol. Every input terminal $i'_j$ of the line de-scrambler 110 is fixedly coupled to one different data terminals $i'_j$ of the parallel interface 205.

The line de-scrambler 210 is configured to accept the permuted sequence d' of data symbols at its input terminal $i'_j$, to restore a predefined order of the data symbols from the permuted sequence d' of data symbols and to output the restored N-symbol data signal d comprising the sequence of data symbols in the predefined order. The restored N-symbol data signal d comprises at least a color component signal of a pixel of the image data.

According to an example of the present application, the video signal receiver further comprises a defect detector 225 configured to detect a defective data signal line $L_k$ and to communicate a fault indication to the video signal transmitter in response to detecting the one or more defective data signal line $L_k$. The parallel bus 300 may comprises a feedback control signal line for communicating the fault indication.

According to an example of the present application, the permuted sequence d' of data symbols is representable by a permutation $\pi_k$ applied to the sequence of data symbols in a predefined order comprised by the N-symbol data signal d. The line de-scrambler 210 has N output terminals $o'_j$. Each capable of outputting a signal comprising one data symbol. The line de-scrambler is further configured to selectively route each data symbol of the permuted sequence d' to one different output terminal $o'_j$ of the line de-scrambler 210 in accordance with the reverse corresponding permutation $\pi_k^{-1}$.

According to an example of the present application, an interconnect system for transmitting a stream of image data signals formed of N-symbol data signals over an error prone wired connection. The system comprises a video signal transmitter 100 with a test signal generator 125, a video signal receiver 200 with a defect detector 225; and a parallel bus 300 having at least N data signal lines $L_j$. Each data signal line $L_j$ is capable of transmitting a signal comprising one data symbol.

The test signal generator 125 is configured to assert one or more predetermined test signals on the at least N data signal lines $L_j$ of the parallel bus 300. The defect detector 225 is configured to detect the one or more predetermined test signals in order to detect an erroneous data signal transmission on one or more defective data signal lines based on the detected one or more predetermined test signals and to issue a fault indication indicative of the one or more detected defective data signal lines.

According to an example of the present application, the test signal generator 125 is configured to assert the one or more predetermined test signals within a blanking interval. The asserting of the one or more predetermined test signals is synchronized with a V-Sync signal indicative of the blanking interval.

According to an example of the present application, a test pattern comprises the N predetermined test signals, each of which for being transmitted on a data signal line $L_j$. Every test signal comprises a bi-level pulse. The pulses are applied in a time-shifted sequence.

According to an example of the present application, a warning signal is output to a user of the interconnect system in response to the fault indication. According to an example of the present application, the fault indication is communicated to a safety controller 350.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An interconnect system for transmitting a stream of N-symbol data signals over an error prone wired connection, the system comprising:
   a parallel bus having at least N data signal lines, each data signal line capable of transmitting a signal comprising one data symbol;
   a line scrambler having N output terminals each for outputting a signal comprising one data symbol;
   a line de-scrambler having N input terminals each for accepting a signal comprising one data symbol; and
   a defect detector configured to detect one or more defective data signal lines, wherein
   every output terminal of the line scrambler is coupled via a different data signal line to every respective input terminal of the line de-scrambler,
   the line scrambler is configured to accept an N-symbol data signal having a sequence of data symbols in a predefined order, and to output a permuted sequence of data symbols at the N output terminals of the line scrambler,
   the one or more data symbols of the N-symbol data signal, which have the lowest significance levels, are output at the one or more output terminals of the line scrambler, which are coupled to the one or more defective data signal lines,
   the line de-scrambler is configured to
   accept the permuted sequence of data symbols at its input terminal,
   restore the predefined order of the data symbols from the permuted sequence of data symbols, and
   output the restored N-symbol data signal comprising a sequence of data symbols in the predefined order.

2. The system according to claim 1, wherein the line scrambler is further configured to
   route the one or more data symbols with the lowest significance levels to the output terminals of the line scrambler, which output terminals are coupled to the one or more defective data signal lines; and
   route every remaining data symbol to one different output terminal.

3. The system according to claim 1, further comprising:
   wherein the permuted sequence of data symbols is representable by a permutation applied to a sequence of data symbols in predefined order comprised by the N-symbol data signal,
   wherein the line de-scrambler has N output terminals each for outputting a signal comprising one data symbol;
   wherein the line de-scrambler is further configured:
   to selectively route each data symbol of the permuted sequence to one different output terminal of the line de-scrambler in accordance with the corresponding reverse permutation.

4. The system according to claim 1,
   wherein the defect detector is configured to initiate a fault indication on the feedback communication connection in response to detecting the one or more defective data signal lines.

5. The system according to claim 4,
   wherein the feedback communication connection is at least one of a side channel communication connection or a feedback control signal line comprises by the parallel bus.

6. The system according to claim 1, further comprising:
a test signal generator configured to assert one or more predetermined test signals on the at least N data signal lines of the parallel bus.

7. The system according to claim 6,
wherein the defect detector is further configured to detect the one or more predetermined test signals in order to detect an erroneous data signal transmission on the defective data signal line.

8. The system according to claim 1,
wherein the N-symbol data signal comprises at least one N-symbol component of a pixel of image data.

9. The system according to claim 1,
wherein the significance levels are predefined and one significance level is assigned to every data symbol.

10. The system according to claim 1, further comprising:
a video signal transmitter including the line scrambler; and
a video signal receiver including the line de-scrambler and the defect detector, wherein
the video signal transmitter and the video signal receiver are coupled via the parallel bus, and
the stream of N-symbol data signals is a stream of pixel data signals each comprising at least one component thereof.

11. A video signal transmitter for transmitting a stream of image data signals over an error prone wired connection to a video signal receiver, the video signal transmitter comprising:
a parallel interface comprising at least N data terminals each capable of outputting a signal comprising one data symbol; and
a line scrambler having N output terminals each capable of outputting a signal comprising one data symbol, wherein
the parallel interface is provided for being coupled to a parallel bus having at least N data signal lines,
every output terminal of the line scrambler is fixedly coupled to one different data terminals of the parallel interface,
the line scrambler is configured to accept at least a color component signal of a pixel of the image data, wherein the color component signal comprises an N-symbol data signal having a sequence of N data symbols in a predefined order, and to output a permuted sequence of data symbols at the N output terminals of the line scrambler, and
the one or more data symbols of the N-symbol data signal, which have the lowest significance levels, are output at the one or more output terminals of the line scrambler, which are coupled to one or more defective data signal lines detected by feedback fault indication transmitted by the video signal receiver.

12. The video signal transmitter according to claim 11, wherein the line scrambler is further configured to
route the one or more data symbol to the output terminal of the line scrambler, which are coupled to the one or more defective data signal line; and
route every remaining data symbol to one different output terminal.

13. The video signal transmitter according to claim 11, further comprising:
a test signal generator configured to assert one or more predetermined test signals on the at least N data signal lines of the parallel bus via the parallel interface.

14. A video signal receiver for receiving a stream of image data signals over an error prone wired connection to a video signal transmitter, the video signal receiver comprising:
a parallel interface comprising at least N data terminals; and
a line de-scrambler having N input terminals each capable of accepting a signal comprising one data symbol, wherein
the parallel interface is provided for being coupled to a parallel bus having at least N data signal lines,
every input terminal of the line de-scrambler is fixedly coupled to one different data terminals of the parallel interface,
the line de-scrambler is configured to accept the permuted sequence of data symbols at its input terminal, to restore a predefined order of the data symbols from the permuted sequence of data symbols, and to output the restored N-symbol data signal comprising the sequence of data symbols in the predefined order, and
the restored N-symbol data signal comprises at least a color component signal of a pixel of the image data.

15. The video signal receiver according to claim 14, further comprising:
a defect detector configured to detect one or more defective data signal lines, and to communicate a fault indication to the video signal transmitter in response to detecting the one or more defective data signal lines.

16. The video signal receiver according to claim 14,
wherein the permuted sequence of data symbols is representable by a permutation applied to the sequence of data symbols in a predefined order comprised by the N-symbol data signal,
wherein the line de-scrambler has N output terminals each for outputting a signal comprising one data symbol;
wherein the line de-scrambler is further configured:
to selectively route each data symbol of the permuted sequence to one different output terminal of the line de-scrambler in accordance with the reverse corresponding permutation.

17. An interconnect system for transmitting a stream of image data signals formed of N-symbol data signals over an error prone wired connection, the system comprising:
a video signal transmitter with a test signal generator;
a video signal receiver with a defect detector; and
a parallel bus having at least N data signal lines, each data signal line capable of transmitting a signal comprising one data symbol, wherein
the test signal generator is configured to assert one or more predetermined test signals on the at least N data signal lines of the parallel bus, and
the defect detector is configured to detect the one or more predetermined test signals in order to detect an erroneous data signal transmission on one or more defective data signal lines based on the detected one or more predetermined test signals, and to issue a fault indication indicative of the one or more detected defective data signal lines.

18. An interconnect system according to claim 17,
wherein the test signal generator is configured to assert the one or more predetermined test signals within a blanking interval.

19. An interconnect system according to claim 17,
wherein a test pattern comprises the N predetermined test signals, each of which for being transmitted on a data signal line $L_j$, wherein every test signal comprises a bi-level pulse, which are applied on the respective data signal line $L_j$ in a time-shifted sequence.

20. An interconnect system according to claim 17, wherein a warning signal is output to a user of the interconnect system in response to the fault indication.

* * * * *